United States Patent [19]
Hanaoka et al.

[11] Patent Number: 5,521,590
[45] Date of Patent: May 28, 1996

[54] DATA CARRIER

[75] Inventors: Tadashi Hanaoka, Koganei; Hiroyki Fukayama, Sayama, both of Japan

[73] Assignee: Citizen Watch Co., Ltd., Tokyo, Japan

[21] Appl. No.: 94,151

[22] PCT Filed: Dec. 4, 1992

[86] PCT No.: PCT/JP92/01585

§ 371 Date: Nov. 26, 1993

§ 102(e) Date: Nov. 26, 1993

[87] PCT Pub. No.: WO93/11509

PCT Pub. Date: Jun. 10, 1993

[30] Foreign Application Priority Data

| Oct. 2, 1902 | [JP] | Japan | 4-289519 |
| Dec. 4, 1991 | [JP] | Japan | 3-347692 |
| Jan. 21, 1992 | [JP] | Japan | 4-029098 |
| Jan. 28, 1992 | [JP] | Japan | 4-007797 |

[51] Int. Cl.$^6$ ............................................. H04Q 7/00
[52] U.S. Cl. ......................................... 340/825.54
[58] Field of Search ................ 340/825.54, 825.72, 340/825.15, 572, 573; 365/185

[56] References Cited

U.S. PATENT DOCUMENTS

| 3,964,024 | 6/1976 | Hutton et al. . | |
| 4,364,043 | 12/1982 | Cole et al. | 340/825.54 |
| 4,650,981 | 2/1987 | Foletta | 235/449 |
| 5,051,953 | 9/1991 | Kitazawa et al. | 365/185 |
| 5,103,222 | 4/1992 | Hogen Esch et al. | 340/825.54 |
| 5,214,409 | 5/1993 | Beigel | 340/572 |
| 5,323,039 | 6/1994 | Asno et al. | 365/185 X |

FOREIGN PATENT DOCUMENTS

| 0282926 | 9/1988 | European Pat. Off. . |
| 0287175 | 10/1988 | European Pat. Off. . |
| 59-212949 | 12/1984 | Japan . |
| 61-101885 | 5/1986 | Japan . |
| 61-226887 | 10/1986 | Japan . |
| 3-58188 | 9/1991 | Japan . |

OTHER PUBLICATIONS

J. G. Nolan, "A Radiation Powered Single Chip EEPROM ID Code Transceiver", Proceedings of the IEEE 1987 Custom Integrated Circuits Conference, 4 May 1987, Portland, Oregon, pp. 684–686.

Eiichi Suzuki, "A Low–Voltage Alterable EEPROM with Metal–Oxide–Nitride–Oxide–Semiconductor (Monos) Structures", IEEE Transactions on Electron Devices, vol. ED-30, No. 2, Feb. 1983, pp. 122–128.

Semiconductor World 1989.7, pp. 98–100.
Semiconductor World 1991.4, pp. 112–115.
Semiconductor World 1969.7, pp. 102–106.

*Primary Examiner*—Donald J. Yusko
*Assistant Examiner*—Edwin C. Holloway, III
*Attorney, Agent, or Firm*—Finnegan, Henderson, Farabow, Garrett and Dunner

[57] ABSTRACT

A data carrier with no battery for reading and writing data transmitted to and from fixed facilities separated from the data carrier by several centimeters, and for rewriting and reading data during use. The data carrier incorporates a MONOS EEPROM, a unit for receiving data from the fixed facilities and writing the data to the EEPROM, and a unit for reading data out of the EEPROM and transmitting the data to the fixed facilities.

27 Claims, 15 Drawing Sheets

DATA CARRIER

TECHNICAL FIELD

The present invention relates to data carriers such as industrial data tags, noncontact IC cards, livestock ID tags, electronic tickets, and electronic tags having no power source and carrying out noncontact data communication with fixed facilities. The distance between the data carriers and the facilities is more than several centimeters.

The present invention relates particularly to an improvement of an electromagnetic coupled data carrier having no battery and being operated by electric power induced in a coil by an alternating-current (AC) magnetic field emitted from the fixed facilities. The data carrier carries out bidirectional data communication with the fixed facilities, and can write and read data to and from an electrically erasable programmable nonvolatile memory incorporated in the data carrier.

BACKGROUND ART

There are various kinds of data carriers, and there are many methods to carry out bidirectional noncontact data communication between a data carrier and a fixed data control unit that is separated from the data carrier by a given distance.

Japanese Examined Patent Publication Nos. 3-12353 and 63-25393, Japanese Unexamined Patent Publication Nos. 51-15947 and 57-32144, U.S. Pat. No. 3,964,024, etc., disclose methods for carrying out bidirectional noncontact data communication between a portable data carrier such as a card and fixed facilities.

Most of these data carriers incorporate batteries. The distance between the data carrier and the fixed facilities having a control unit for carrying out the bidirectional noncontact data communication is usually fixed. Accordingly, errors rarely occur in data write and read operations.

As communication systems employing the data carriers become widely used, a need rises to reliably transfer data even if the distance between the data carriers and the fixed facilities varies widely. When the distance varies, the voltage of a transmitted signal detected at the data carriers and fixed facilities fluctuates. Accordingly, it will be impossible to bidirectionally transmit data with no errors or malfunctions.

The conventional data carriers having no batteries are incapable of writing and reading data or transmitting data to and from fixed facilities when a distance between them varies in a range of several centimeters to several meters. In particular, the presently marketed electromagnetic coupled data carriers having no batteries are only capable of reading data that are permanently or semi-permanently recorded. Various experiments have been made to freely rewrite data in a data carrier during use. Since an EEPROM used as a data storage unit needs a large rewrite voltage and since the EEPROM has insufficient reliability as a memory, no practical data carrier that is freely erasable and programmable has been proposed.

To solve the problems of the EEPROM, experiments have been made to use an SRAM as a data storage unit of the data carriers. Several data carriers employing SRAMs have been produced. This type of data carrier, however, must incorporate a battery. The battery has a limited service life and insufficient reliability. In addition, the battery increases the weight and size of the data carrier.

Among the prior arts, the Japanese Examined Patent Publication No. 3-12353 discloses a data carrier that is capable of writing and reading data, provided that a distance between the data carrier and fixed facilities is less than several centimeters. Due to this short distance, electric power can be easily supplied from the fixed facilities to the data carrier. Generally, this type of product is distinguished from the data carrier and is called a noncontact memory card.

The electromagnetic coupled data carrier having no power source frequently suffers a loss of voltage due to insufficient power from the fixed facilities. This results in incorrect logic operations of circuits in the data carrier, and it erroneously rewrites the electrically erasable programmable nonvolatile memory incorporated in the data carrier. To prevent such an accident, a rewrite control circuit of the nonvolatile memory must not be activated unless a supplied voltage is sufficiently high to secure a correct operation.

Accordingly, a main object of the present invention is to develop an electromagnetic coupling data carrier that solves the problems of the prior art, is capable of storing and reading data with no battery, stably transmits data to and from fixed facilities with a distance between them of more than several centimeters, and has improved data storage reliability. The data carrier employs a low power consumption high performance CMOS IC having a nonvolatile memory called a MONOS memory that is erasable and writable under low power conditions.

DISCLOSURE OF THE INVENTION

To achieve the object, a data carrier according to the present invention basically employs a coil for receiving an alternating-current (AC) magnetic field emitted from fixed facilities and providing an AC voltage; a rectifier circuit for rectifying the AC voltage into a direct current (DC) source voltage; a wave detector circuit for demodulating communication data superimposed on the AC voltage, to extract input data; a data carrier main circuit for receiving the input data; a modulator for preparing reply data to the fixed facilities according to data stored in the data carrier main circuit; and a coil for generating an AC magnetic field according to the reply data. The data carrier has no battery. The data carrier main circuit has a MONOS EEPROM; a data read unit for reading data from the EEPROM; a data write unit for writing data to the EEPROM; and a rewrite voltage generator for generating and controlling a voltage for rewriting data in the EEPROM. The data carrier further has a voltage detector circuit for determining the level of the source voltage provided by the rectifier circuit or the level of a constant voltage produced from the source voltage; a switch controlled by the voltage detector circuit; and first and second blocks that are connected to and disconnected from each other through the switch. The first block involves the coil, rectifier circuit, and voltage detector circuit. The second block involves the data carrier main circuit and a power-on reset circuit. The data carrier main circuit includes an initialization circuit for initializing the data carrier main circuit.

The voltage detector circuit has two detection levels. The first detection level closes the switch to supply the source voltage to the second block. The second detection level opens the switch to stop the supply of the source voltage to the second block. The first detection level is higher than the second detection level.

The data carrier of the present invention further has a voltage decision unit that compares an input voltage with a predetermined voltage, and if the input voltage is higher than the predetermined voltage, provides an enable signal to rewrite the memory circuit in the data carrier main circuit.

The fixed facilities provide electric power in a noncontact manner to the elements of the data carrier including the MONOS EEPROM. Generally, electric power supplied in a noncontact manner is very weak. Since the MONOS EEPROM requires very little electric power to rewrite data, even the data carrier having no battery can read and write data to and from the EEPROM. The MONOS EEPROM, which is a semiconductor memory element disclosed in many publications, is rewritten with a relatively small voltage and has an excellent service life in terms of data storage and repetitive rewrite operations. The details of the MONOS EEPROM are disclosed in, for example, IEEE Transactions on Electron Device, Vol. ED-30, No. 2, February 1983, p. 122, Semiconductor World, July 1989, p. 98, Semiconductor World, April 1991, p. 112, and Japanese Examined Patent Publication (B2) No. 358188. FIG. 2(a) is a sectional view showing an element of the MONOS EEPROM. A MONOS transistor serving as a main element of the EEPROM is formed on a p well that is formed in an area on the surface of an n-type semiconductor (silicon) substrate. The p well includes $n^+$ drain and source electrodes. A gate of the MONOS transistor differs from that of a standard transistor. The gate has a 3-layer gate insulation film including a tunnel oxide film O1 deposited on the p well, a silicon nitride film N deposited on the film O1, and a top oxide film O2 deposited on the film N. The thickness of each of the layers is an important factor that determines the characteristics of the MONOS transistor. It is said that the transistor shows excellent performance as an EEPROM element when the thicknesses of the layers O1, N, and O2 are 2, 5, and 4 nanometers, respectively. On the gate insulation film, a polysilicon gate electrode M is formed. The p well, drain, and source of the MONOS transistor are provided with a first electrode P1, a second electrode P2, and a third electrode P3, respectively. These electrodes are connected to peripheral circuits, to form the EEPROM. To write data to the MONOS EEPROM, the gate electrode M is set to reference potential, and a write voltage of −8 to −11 V is applied to the first electrode P1. As a result, electrons move from the p well to the silicon nitride film N through the tunnel oxide film O1 and stay in the nitride film N and on an interface between the nitride film N and the top oxide film O2. This results in increasing the threshold voltage of the MONOS transistor, to make the transistor nonconductive. During the write operation, the potential of each of the other electrodes P2 and P3 is not important but is usually kept at the reference potential. To erase data, the first electrode P1 is set to the reference potential, and an erase voltage of −8 to −11 V is applied to the gate electrode M. As a result, the electrons in the gate insulation film move to the p well, to decrease the threshold voltage of the MONOS transistor. The transistor then shows depletion characteristics and becomes conductive. At this time, it is preferable to keep each of the other electrodes at the reference potential. Reading data from the MONOS EEPROM will be explained with reference to FIG. 2(b). The MONOS transistor is connected in series with a standard enhancement MOS transistor. The two transistors are simultaneously turned ON to divide a source voltage. At this time, the gate electrode M and second electrode P2 of the MONOS transistor and a gate G of the MOS transistor are connected to the reference potential. The first electrode P1 of the MONOS transistor and a source electrode P4 of the MOS transistor receive a source voltage of −2.5 to −6.5 V. The third electrode P3 of the MONOS transistor and a drain of the MOS transistor are connected to each other, to form a voltage dividing point. The voltage dividing point provides an output signal of level LOW when data is written to the MONOS transistor, and an output signal of level HIGH when no data is written. The write and erase voltages for the MONOS EEPROM explained above may differ from each other. Selecting the different voltages will change data erase and write periods, data storage characteristics, and a service life of the memory element.

The MONOS EEPROM explained above and employed by the present invention involves little horizontal movements of electrons, so that it is advantageous for storing data. An insulation film such as an $SiO_2$ film inside the MONOS EEPROM is very thin, so that electrons or holes are easily injectable thereto even with a low voltage. Unlike a standard memory that requires about 20 V, the MONOS EEPROM requires only about 8 to 9 V to move electrons. Namely, the MONOS EEPROM operates at reduced data write and read voltages.

In the MONOS EEPROM, an internally produced tunnel current is small, unlike a standard semiconductor memory in which a large current flows. Namely, the MONOS EEPROM never produces a large current, and therefore, consumes low power.

Unlike the standard semiconductor memory, the MONOS EEPROM never causes a sudden memory destruction. Data stored in the MONOS EEPROM gradually disappears as time elapses. Namely, the characteristics of the MONOS EEPROM are not destructive but deteriorative. Accordingly, the MONOS EEPROM has a long service life.

The MONOS EEPROM employed by the present invention functions as mentioned above. In particular, the MONOS EEPROM allows data write and read operations to be carried out at a low voltage and consumes small electric power. The MONOS EEPROM, therefore, realizes a data carrier of, for example, electromagnetic coupled type, having no battery and operable under severe conditions.

The data carrier according to the present invention is employable, for example, as an electronic ticket for ski lifts. In this case, fixed facilities that emit an AC electromagnetic field are installed near an entrance for the ski lifts. The fixed facilities have a proper controller for superimposing various commands on magnetic fields and emitting them.

The data carrier is carried by a skier, who accesses the fixed facilities installed at the entrance to the ski lifts. A way of accessing the fixed facilities differs from skier to skier, and therefore, a distance between the fixed facilities and the data carrier always varies.

Accordingly, a voltage generated inside the data carrier widely fluctuates depending on the distance. When the data carrier is brought very close to the fixed facilities, a large voltage will be generated in the data carrier. If the voltage exceeds the withstand voltage of any element of the data carrier, the element will be damaged. If the data carrier is far from the fixed facilities, a weak voltage will be generated in the data carrier, so that the data carrier will not become operational.

The data carrier is also affected by the kinds and thicknesses of clothing and gloves worn by the skier carrying the data carrier.

In this way, the data carrier is used under very severe data communication conditions. The data carrier, therefore, is required to stably communicate data and surely store data even under such severe conditions.

The MONOS EEPROM according to the present invention is appropriate for such conditions.

The inventors of the present invention have succeeded in industrially manufacturing MONOS EEPROMs driven at a low voltage of −10 V or lower. The data carrier according to the present invention has no battery and operates with electric power supplied from fixed facilities. The data carrier has an integrated circuit involving the MONOS EEPROM operating at a low voltage. The data carrier includes a unit for receiving data from the fixed facilities and writing the data to the EEPROM, as well as a unit for reading data out of the EEPROM and transmitting the same to the fixed facilities.

BEST MODE OF CARRYING OUT THE INVENTION

Data carriers according to embodiments of the present invention will be explained in detail with reference to the drawings.

Figure 1:
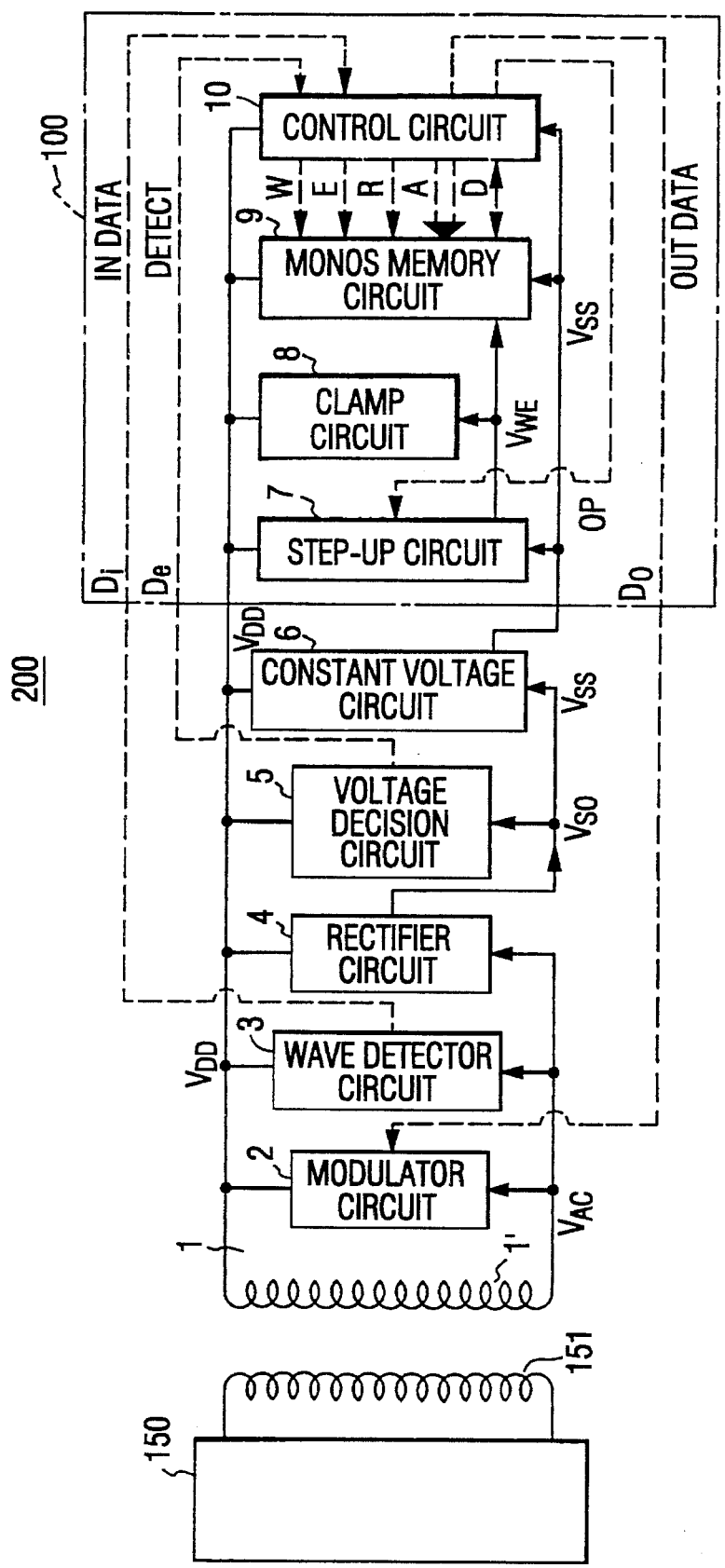
FIG. 1 is a block diagram showing a data carrier according to an embodiment of the present invention.
Figure 2A:
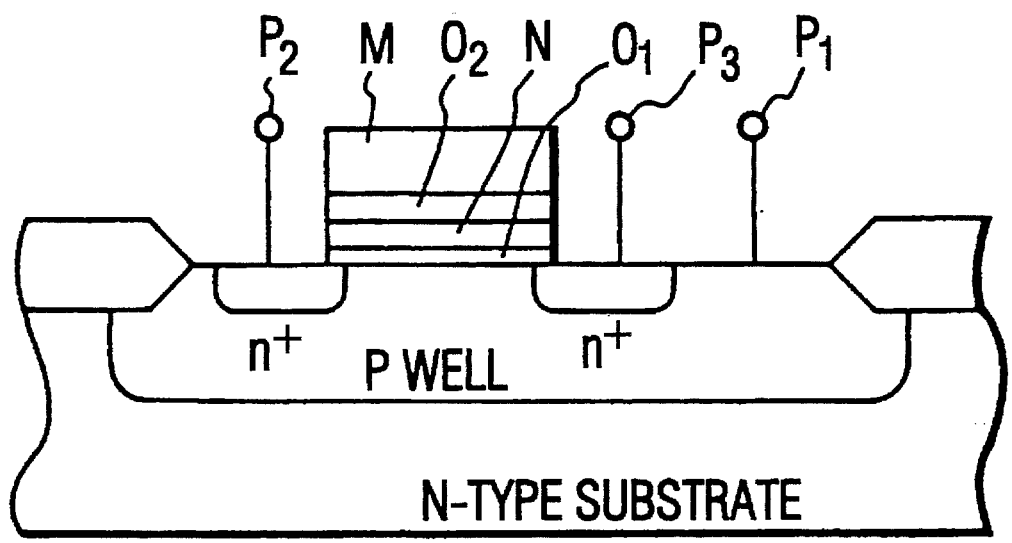
FIG. 2(a) and FIG. 2(b) is a sectional view and a circuit diagram, showing a transistor of a MONOS EEPROM employed in the data carrier according to the present invention.
Figure 2B:
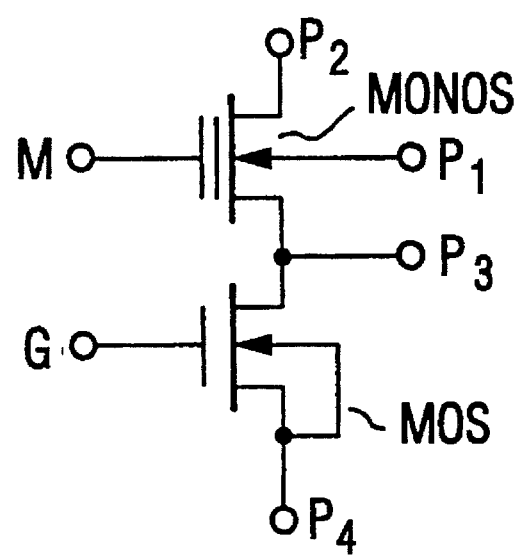

FIG. 1 is a block diagram showing a data carrier 200 according to an embodiment of the present invention.

In FIG. 1, the data carrier 200 has a reception coil 1 for receiving an AC magnetic field emitted from fixed facilities 150 and providing an AC voltage; a rectifier circuit 4 for rectifying the AC voltage into a direct-current (DC) source voltage; a wave detector circuit 3 for demodulating communication data superimposed on the AC voltage, to extract input data; a data carrier main circuit 100 for receiving the input data; a modulator circuit 2 for generating reply data for the fixed facilities 150 according to data stored in the data carrier main circuit 100; and a transmission coil 1' for generating an AC magnetic field according to the reply data. The data carrier 200 has no battery. The data carrier main circuit 100 includes a memory circuit 9 formed of a MONOS EEPROM and a control circuit 10. The control circuit 10 has a data read unit for reading data out of the memory circuit 9 and a data write unit for writing data to the memory circuit 9.

In this embodiment, a single coil serves as the reception coil 1 and transmission coil 1'.

The data carrier main circuit 100 of the data carrier 200 of the present invention contains the EEPROM, the control circuit 10 for writing and reading data to and from the EEPROM, and a step-up circuit 7 for increasing the DC source voltage to provide a rewrite voltage.

It is preferable that the data carrier main circuit 100 is provided with a voltage decision circuit 5 for detecting a predetermined voltage level for enabling the step-up circuit 7.

It is preferable that the data carrier main circuit 100 has a clamp circuit 8 for clamping the rewrite voltage Vw lower than a predetermined value.

The data carrier main circuit 100 may have both the voltage decision circuit 5 for determining whether or not the rewrite voltage for the memory circuit 9 formed of the MONOS EEPROM is larger than the predetermined value and the clamp circuit 8 for clamping the rewrite voltage lower than the predetermined value.

Operation of the data carrier according to the present invention of FIG. 1 will be explained. In FIG. 1, continuous lines represent flows of electric power, and dotted lines represent flows of signals. The flows of electric power and the operations of the circuit blocks will be explained. The fixed facilities 150 emit an AC magnetic field, which induces AC power in the coil 1. An end of the coil 1 is connected to a reference potential line VDD to provide reference potential. The other end of the coil 1 is connected to the modulator circuit 2, wave detector circuit 3, and rectifier circuit 4 through an AC voltage line VAC to supply the AC power to these circuits. The rectifier circuit 4 rectifies the AC power into a direct-current (DC) source voltage (negative voltage) Vss for driving the data carrier. The DC source voltage Vss is supplied to the voltage decision circuit 5 and constant voltage circuit 6 through a primary source line VSO. The voltage decision circuit 5 determines whether or not the voltage on the primary source line VSO is sufficiently large to operate the control circuit 10 and memory circuit 9 formed of the EEPROM of the data carrier main circuit 100 of the data carrier 200. If the voltage is sufficiently large, the voltage decision circuit 5 provides an operation enable signal DETECT to the control circuit 10. The constant voltage circuit 6 stabilizes the DC source voltage and provides a stabilized voltage to the step-up circuit 7, the memory circuit 9 formed of the MONOS EEPROM, and the control circuit 10 through a main power source line VSS. The step-up circuit 7 increases the output voltage of the constant voltage circuit 6 and supplies a rewrite voltage to the clamp circuit 8 and memory circuit 9 through a rewrite voltage line VWE. The maximum value of the rewrite voltage is restricted by the clamp circuit 8 so that an excessive voltage will not be applied to the memory circuit 9. In this arrangement, digital data superimposed on the AC magnetic field emitted from the fixed facilities 150 is detected by the wave detector circuit 3, which provides input data INDATA to the control circuit 10. The input data INDATA is composed of a command section for controlling the data carrier and a data section containing data to be stored in the memory circuit 9. The control circuit 10 interprets the command section, so that the data carrier may carry out a required function. If the command is to read data out of a specific address of the memory circuit 9, the control circuit 10 provides the memory circuit 9 with an address signal A as well as a read control signal R. The required data is read out of the memory circuit 9 through a data line D. The control circuit 10 transfers the read data as output data OUTDATA to the modulator circuit 2. The modulator circuit 2 changes the load impedance of the coil 1 according to the output data OUTDATA, to modulate the amplitude of a current flowing through the coil 1, thereby transmitting data to the fixed facilities 150.

When the command is to rewrite data in the memory circuit, the control circuit 10 checks the operation enable signal DETECT provided by the voltage decision circuit 5 to see whether or not there is sufficient power to operate the data carrier main circuit 100. If there is sufficient power, the control circuit 10 provides a step-up operation signal OP to the step-up circuit 7, which then increases the source voltage to the rewrite voltage, which is provided to the rewrite power source line VWE. Thereafter, the control circuit 10 provides an address signal A and a memory erase signal E to erase data at a specified address. At the same time, a timer circuit in the control circuit 10 is activated to measure a predetermined delay period. After a sufficient erase operation, the memory erase signal is stopped. Then, the control circuit 10 provides data to be written to the data line D, as well as a write signal W. At the same time, the timer circuit is started to measure a period needed for a sufficient write operation. Thereafter, the write signal W is stopped. This completes the data rewrite operation. If there is other rewrite data, another address signal A is provided and a series of the operations including the erase operation are repeated. If there is no data to be rewritten, the step-up operation signal OP is stopped to finish the rewrite operation. In the above explanation for the data read and rewrite operations, data are handled in series bit by bit through the single data line. Generally, a plurality of parallel data lines are employed, and a serial-to-parallel converter and a parallel-to-serial converter are arranged in the control circuit 10, to read and rewrite data word by word.

The voltage set in the voltage decision circuit 5 may be, for example, 2.5 V. When an input voltage is greater than 2.5 V, a data rewrite operation for the memory is enabled.

Figure 3:
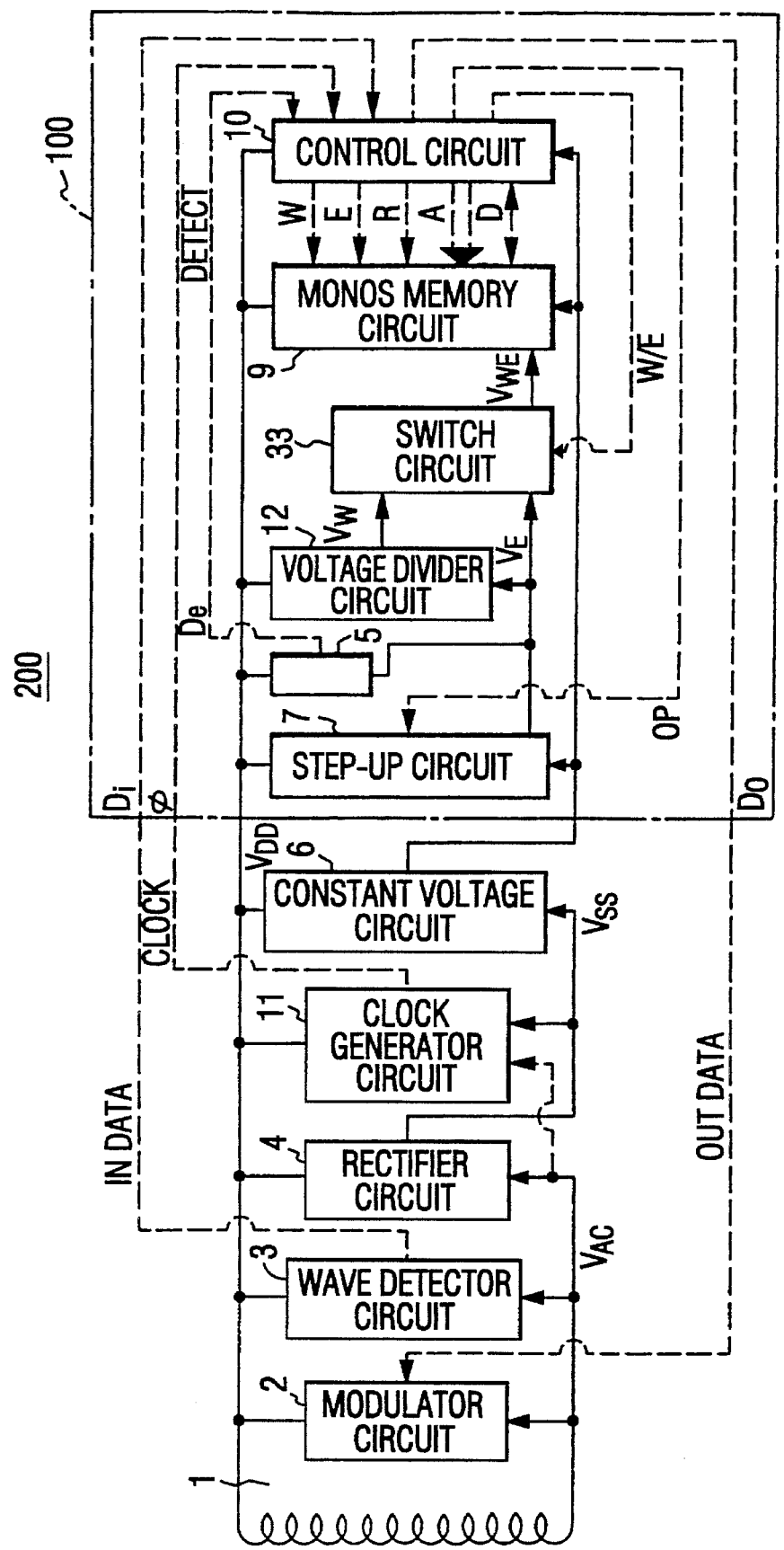
FIG. 3 is a block diagram showing a data carrier according to a second embodiment of the present invention.

FIG. 3 is a block diagram showing a data carrier according to another embodiment of the present invention. This embodiment employs a clock generator circuit 11, which shapes the waveform of an AC voltage induced in a coil 1 into a clock signal CLOCK for the data carrier. The clock signal CLOCK is supplied to a control circuit, which uses the signal as a timing signal for data transmission and a time reference signal for a timer circuit.

This embodiment is not provided with the clamp circuit 8 of FIG. 1. Since a ratio of an input voltage to an output voltage of a step-up circuit 7 is constant, a memory circuit 9 will not receive an excessive voltage if an output voltage of a constant voltage circuit 6 is properly set. Namely, the constant voltage circuit 6 has the function of the clamp circuit 8. This embodiment does not extract an extra current from an increased voltage source, so that this embodiment is effective to save electric power of the data carrier. This embodiment further has a voltage divider circuit 12 and a switch circuit 33. The switch circuit 33 selects one of an erase voltage VE, i.e., an output voltage of the step-up circuit 7 and a write voltage VW, which is provided by the voltage divider circuit 12 by dividing the erase voltage VE. The selected voltage is supplied to the memory circuit 9. A control circuit 10 selects the write voltage VW when writing data to the memory circuit 9 and selects the erase voltage VE when erasing data in the memory circuit 9. For selecting the voltages, the control circuit 10 provides a voltage selection signal W/E for controlling the switch circuit 33. This arrangement improves the reliability of a data write operation of a MONOS EEPROM. Although this embodiment generates the write voltage VW by dividing the erase voltage VE, it is possible to employ two step-up circuits that generate the write voltage VW and erase voltage VE, respectively. The magnitude of each of the write voltage VW and erase voltage VE is determined according to the use of the data carrier. For example, if it is important to shorten a write period more than to extend a service life, the absolute values of both the voltages must be increased. If it is required to shorten a write period less than an erase period, the write voltage VW must be larger than the erase voltage VE.

The memory circuit 9 formed of the MONOS EEPROM according to the present invention has an erase speed slower than a write speed. Accordingly, it is preferable to set the erase voltage VE to be higher than the write voltage VW.

Alternatively, the supply periods of the write voltage and erase voltage may differ from each other.

A timer required for this purpose may be arranged in the control circuit 10.

Figure 4:
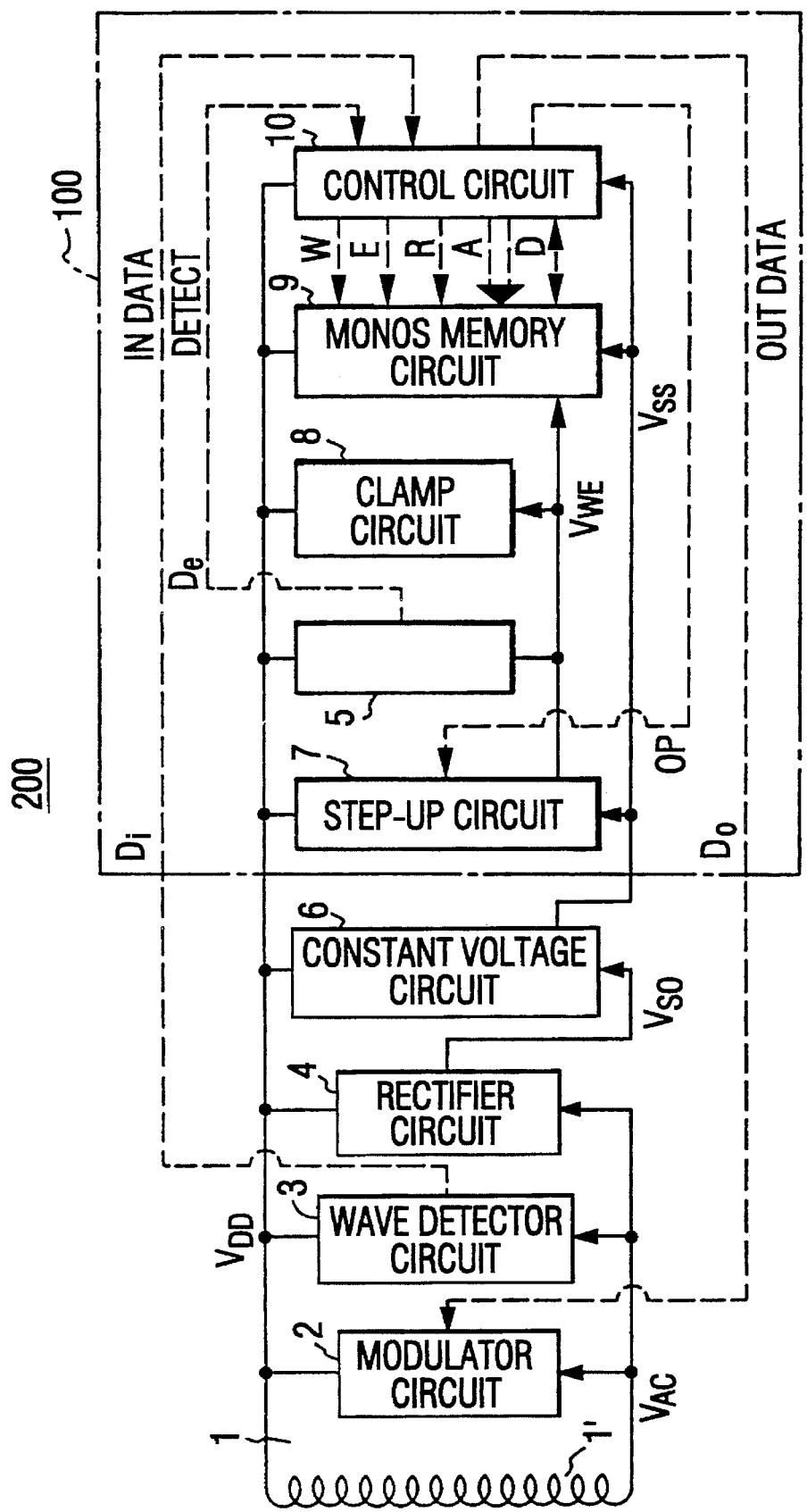
FIG. 4 is a block diagram showing a data carrier according to a third embodiment of the present invention.

FIG. 4 is a block diagram showing a data carrier 200 according to still another embodiment of the present invention. A data carrier main circuit 100 of this embodiment has a voltage decision unit 5 as well as a clamp circuit 8.

A threshold value in the voltage decision unit 5 is about −9 V.

When a command for rewriting data in an EEPROM is sent to a control circuit 10 through INDATA, the control circuit 10 activates a step-up circuit 7 to generate a rewrite voltage VW. The voltage decision unit 5 tests the rewrite voltage VW, and if the voltage VW is nearly equal to a rewrite enable voltage of −9 V of the EEPROM, provides a rewrite enable signal DETECT to the control circuit 10.

The data carrier 200 has no battery. In actual use, the data carrier 200 rewrites a built-in memory circuit 9 and transmits data stored in the memory circuit 9 to fixed facilities 150, according to data and commands received from the fixed facilities 150 in a noncontact manner.

Since the MONOS EEPROM has high reliability, the data carrier has excellent data storage characteristics. Since the data carrier has no battery, it has actually an infinite service life. The data carrier according to the present invention, therefore, is repeatedly usable to make it inexpensive, save natural resources, and be good for the earth environment.

Since data stored in the data carrier can be erased and rewritten during actual use, the data carrier has a wider application range. For example, the data carrier may be used as a data tag for factory automation. A process plan of a product is written to a data carrier on site, and the data carrier is attached to the product. Every product is provided with a data carrier and is fed onto a production line. Information specific to each process is written to the data carrier during the process and the product with the data carrier is sent to a downstream process. Accordingly, the data carrier streamlines the production processes and improves the quality of the product. Since the data carrier has no battery, it withstands severe temperature conditions through the processes. Even in processes that damage conventional data tags, the data carriers according to the present invention are employable. Another application of the data carriers according to the present invention is electronic tickets for public transportation. The data carriers have advantageous functions in this application. When the data carrier is put in an automatic wicket, data such as the name of the station and time are written to the data carrier. This effectively prevents an illegal ride. This function is particularly important for commutation tickets and coupon tickets. Since the data carriers have no batteries, they realize light and compact electronic tickets. Accordingly, environmental pollution will be minimum even if a large number of such tickets are produced. The data carriers used as commutation tickets and coupon tickets can be recycled, so that the costs of the data carriers virtually become lower than those of throwaway magnetic cards and IC cards.

Figure 5:
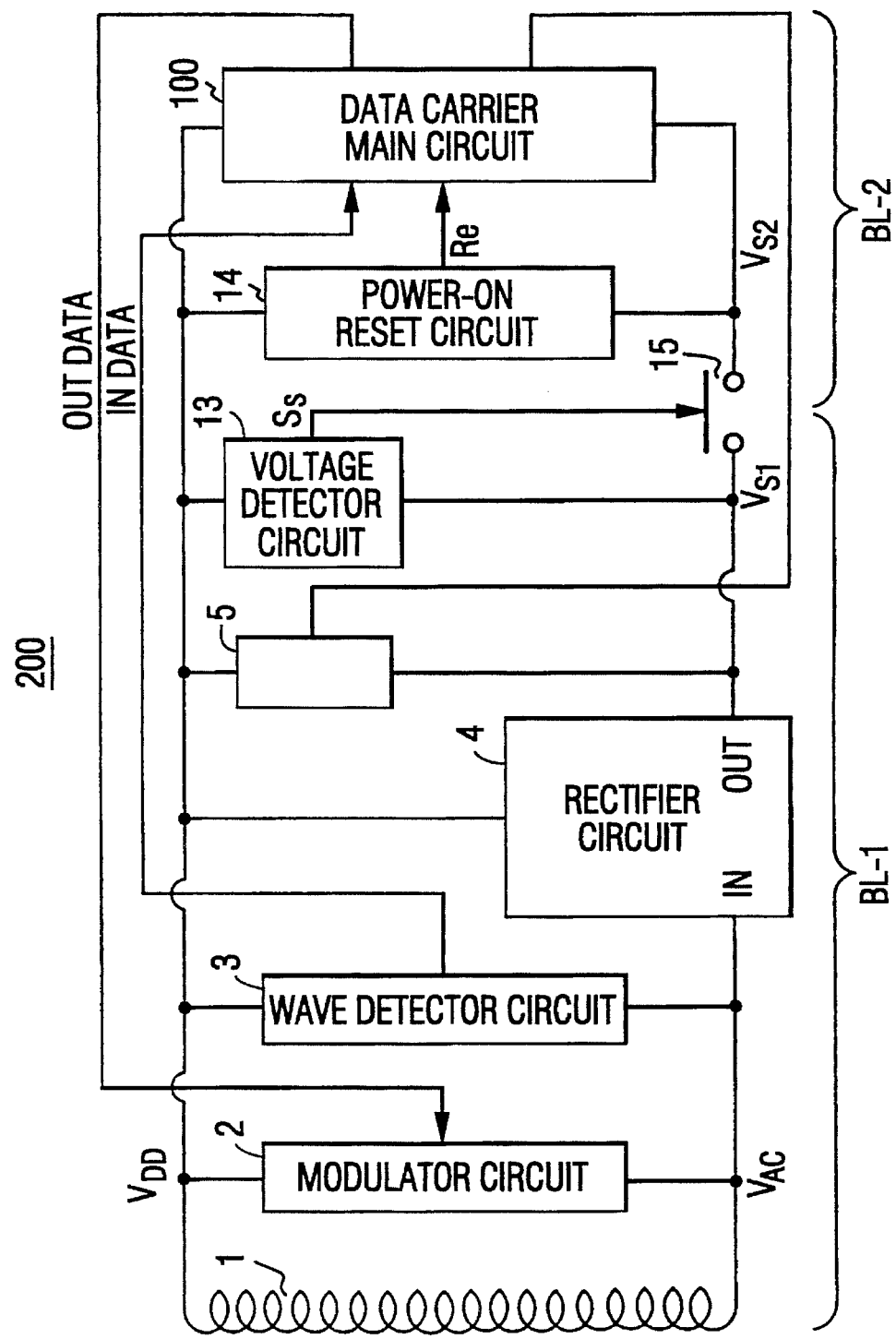
FIG. 5 is a block diagram showing a basic example of a data carrier power source circuit according to the present invention.

FIG. 5 shows an example of a power source circuit of a data carrier according to the present invention. The data carrier 200 electromagnetically couples with electromagnetic waves emitted from fixed facilities 150. A reception coil 1 incorporated in the data carrier 200 produces AC power in response to the electromagnetic waves. The data carrier 200 rectifies the AC power into source power that drives the data carrier.

The data carrier 200 has a voltage detector circuit 13 for determining the level of a source voltage generated by a rectifier circuit 4 or of a constant voltage prepared from the source voltage. The voltage detector circuit 13 controls a switch 15. The switch 15 connects and disconnects first and second blocks BL-1 and BL-2 to and from each other. The first block BL-1 includes the coil 1, rectifier circuit 4, and voltage detector circuit 13. The second block BL-2 includes a data carrier main circuit 100 and a power-on reset circuit 14 serving as an initialization circuit for initializing a memory circuit.

The power source circuit of the data carrier 200 determines whether or not a voltage generated from an input alternating current is at a sufficient level to drive the memory circuit 9. If the voltage level is insufficient, the power source circuit stops the supply of the voltage to the memory circuit 9. If the voltage level is sufficient, the power source circuit supplies the voltage to the EEPROM 9.

The second block BL-2 of the data carrier 200 includes the power-on reset circuit 14 for initializing the data carrier main circuit 100.

The voltage detector circuit 13 has two kinds of detection levels. The first detection level closes the switch 15 to supply the source voltage to the second block BL-2. The second detection level opens the switch 15 to stop the supply of the source voltage to the second block BL-2.

It is preferable that the first detection level of the voltage detector circuit 13 is higher than the second detection level thereof.

The voltage detector circuit 13 included in the first circuit block BL-1 determines whether or not electric power induced in the coil generates a predetermined voltage. If the predetermined voltage is obtained, the circuit 13 closes the switch 15. As a result, the voltage is supplied to the second circuit block BL-2, to activate the power-on reset circuit 14. The circuit 14 initializes logic circuits such as the control circuit 10 for the memory circuit 9. This uniquely fixes the conditions of the logic circuits, to prevent unexpected operations of the logic circuits.

The details of the power source circuit of the data carrier of FIG. 5 will be explained.

In FIG. 5, an end of the coil 1 is connected to a reference potential line Vdd, and the other end thereof is connected to an induced voltage line Vac. Between the reference potential line Vdd and the induced voltage line Vac, there are connected a modulator circuit 2, a wave detector circuit 3, and the input terminals of the rectifier circuit 4 and voltage decision circuit 5. An output terminal of the rectifier circuit 4 is connected to a first power source line Vs1. The voltage detector circuit 13 is connected between the first power source line Vs1 and the reference potential line Vdd. The first power source line Vs1 is connected to an input terminal of the switch 15. An output terminal of the switch 15 is connected to a second power source line Vs2. The power-on reset circuit 14 and data carrier main circuit 100 are connected between the second power source line Vs2 and the reference potential line Vdd. The data carrier main circuit 100 includes at least the nonvolatile memory circuit 9, a rewrite control circuit for the memory circuit, and a read control circuit for the memory circuit.

When the data carrier 200 is placed in an AC magnetic field emitted from the fixed facilities 150, an AC voltage is induced in the coil 1, and the induced voltage appears on the induced voltage line Vac. The AC voltage is rectified and filtered by the rectifier circuit 4 into a DC voltage, which is supplied to the first power source line Vs1. The DC voltage is supplied to the input terminal of the switch 15. At the same time, the voltage detector circuit 13 checks the voltage to see whether or not the voltage is sufficiently large to stably operate the data carrier main circuit 100. If the voltage is below a set value, the voltage detector circuit 13 provides a switch control signal Ss to turn OFF the switch 15, so that no power is supplied to the data carrier main circuit 100 and the data carrier 200 performs no operation. If the voltage is sufficiently large, the voltage detector circuit 13 provides a switch control signal Ss to turn ON the switch 15. As a result, the voltage is supplied to the second power source line Vs2 and to the power-on reset circuit 14 and data carrier main circuit 100. The power-on reset circuit 14 provides an initialization signal to initialize the data carrier main circuit 100, so that the main circuit 100 is put in a communication standby state.

When amplitude modulated communication data is superimposed on an AC magnetic field, the amplitude modulated data will be included in an AC voltage appearing on the induced voltage line Vac. The wave detector circuit 3 demodulates the data. The data is transmitted as DATAin to the data carrier main circuit 100, which interprets the data. According to the interpreted result, the data carrier main circuit 100 rewrites the memory circuit 9, or reads data to be sent back to the fixed facilities 150 out of the memory circuit 9 and provides the read data as communication data DATAout. According to the DATAout, the modulator circuit 2 changes impedance between the induced voltage line Vac and the reference potential line Vdd, to modulate the amplitude of an AC current flowing to the coil 1. This results in changing an AC magnetic field emitted from the coil, thereby sending the reply data to the fixed facilities. In this way, the data carrier 200 stably carries out data communication. The embodiment of FIG. 5 is not provided with the constant voltage circuit 6. This arrangement is sufficient to carry out data communication.

Figure 6:
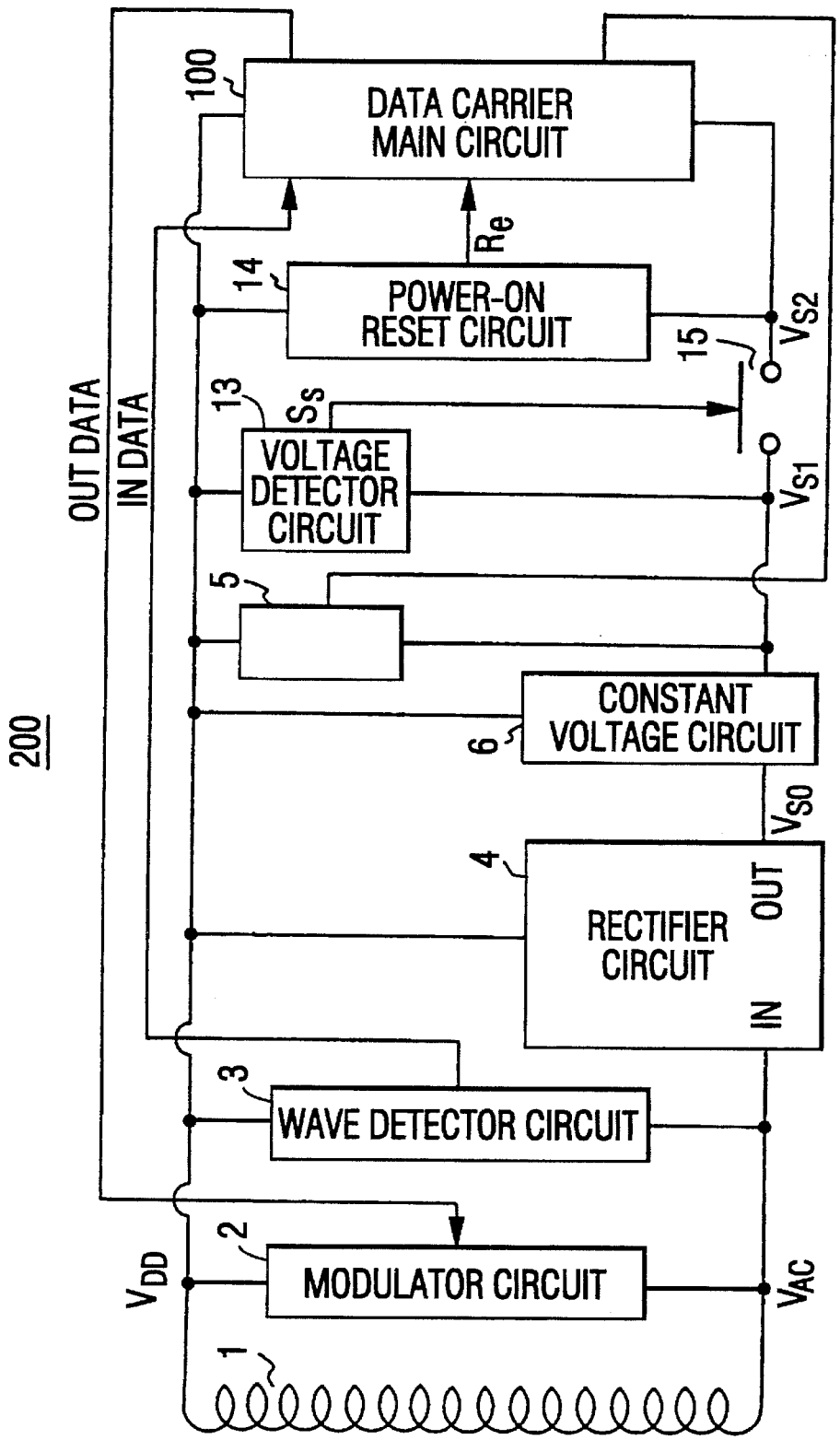
FIG. 6 is a block diagram showing a second example of a data carrier power source circuit according to the present invention.

FIG. 6 is a block diagram showing a data carrier employing a constant voltage circuit, according to another embodiment of the present invention. This embodiment is resembles the embodiment of FIG. 5. This embodiment has an improvement in that an output of a rectifier circuit 4, i.e., a DC voltage Vs0 is stabilized by the constant voltage circuit 6 and is then delivered to a voltage detector circuit 13 and an input terminal of a switch 15. The stabilized voltage from the constant voltage circuit 6 must be sufficiently large to secure the operation of a data carrier main circuit 100. Even if the DC voltage Vs0 is small and the output voltage of the constant voltage circuit 6 is not stable, the voltage detector circuit 13 may determine that the output voltage is greater than a set value. Then, a switch control signal Ss is provided to turn ON the switch 15 to start the operation of the data carrier.

According to this embodiment, the data carrier main circuit 100 causes no malfunction even if the data carrier 200 is too close to fixed facilities 150 and an excessive voltage is induced in the coil 1.

Figure 7:
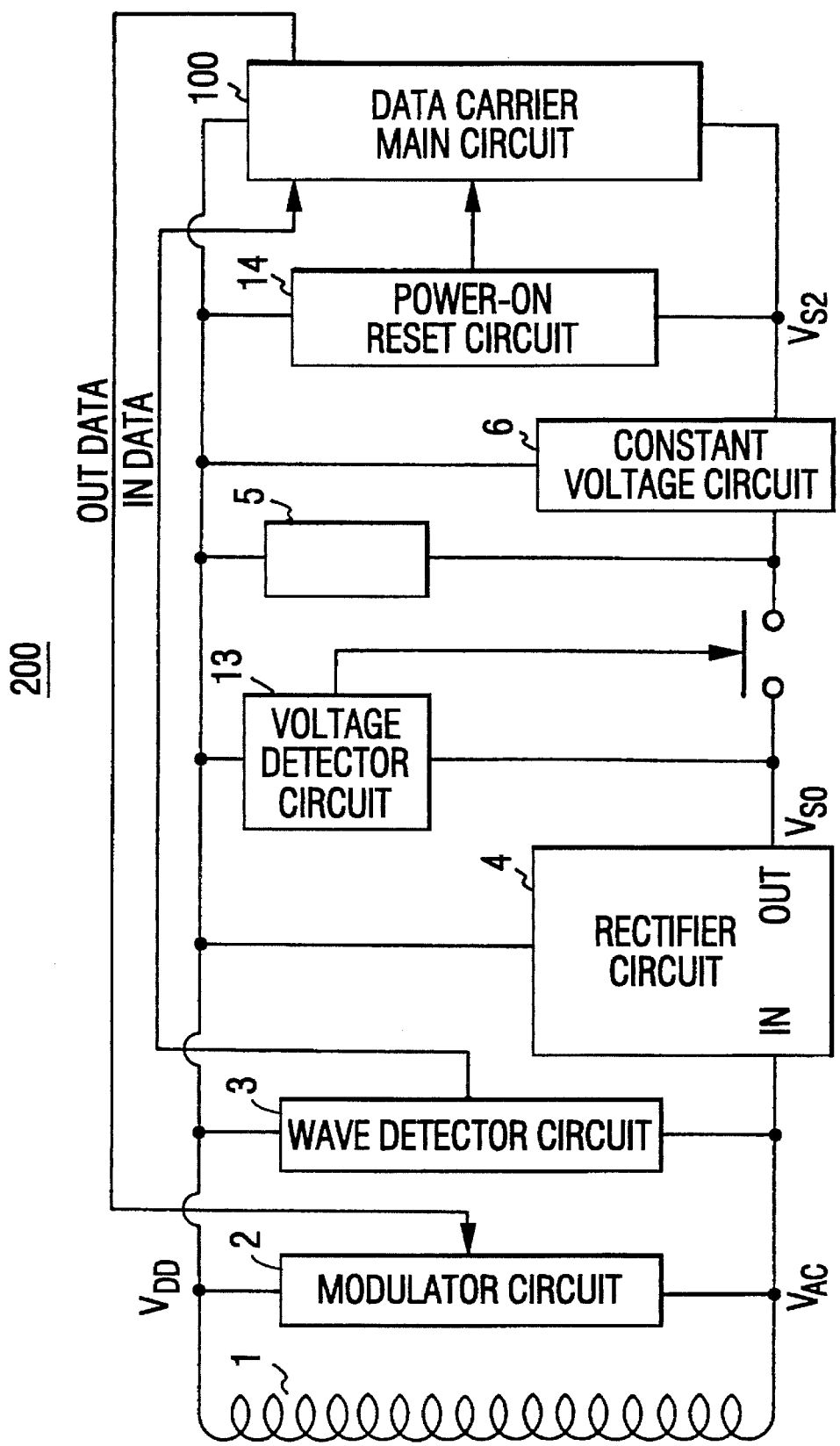
FIG. 7 is a block diagram showing a third example of a data carrier power source circuit according to the present invention.

FIG. 7 is a block diagram showing a data carrier according to still another embodiment of the present invention. This embodiment is slightly different from that of FIG. 6. In this embodiment, a voltage detector circuit 13 checks a DC voltage Vs0 provided by a rectifier circuit 4. A constant voltage circuit 6 and a voltage decision circuit 5 are included in a second circuit block. The operations and effect of this embodiment are substantially the same as those of the embodiment of FIG. 6.

Figure 8:
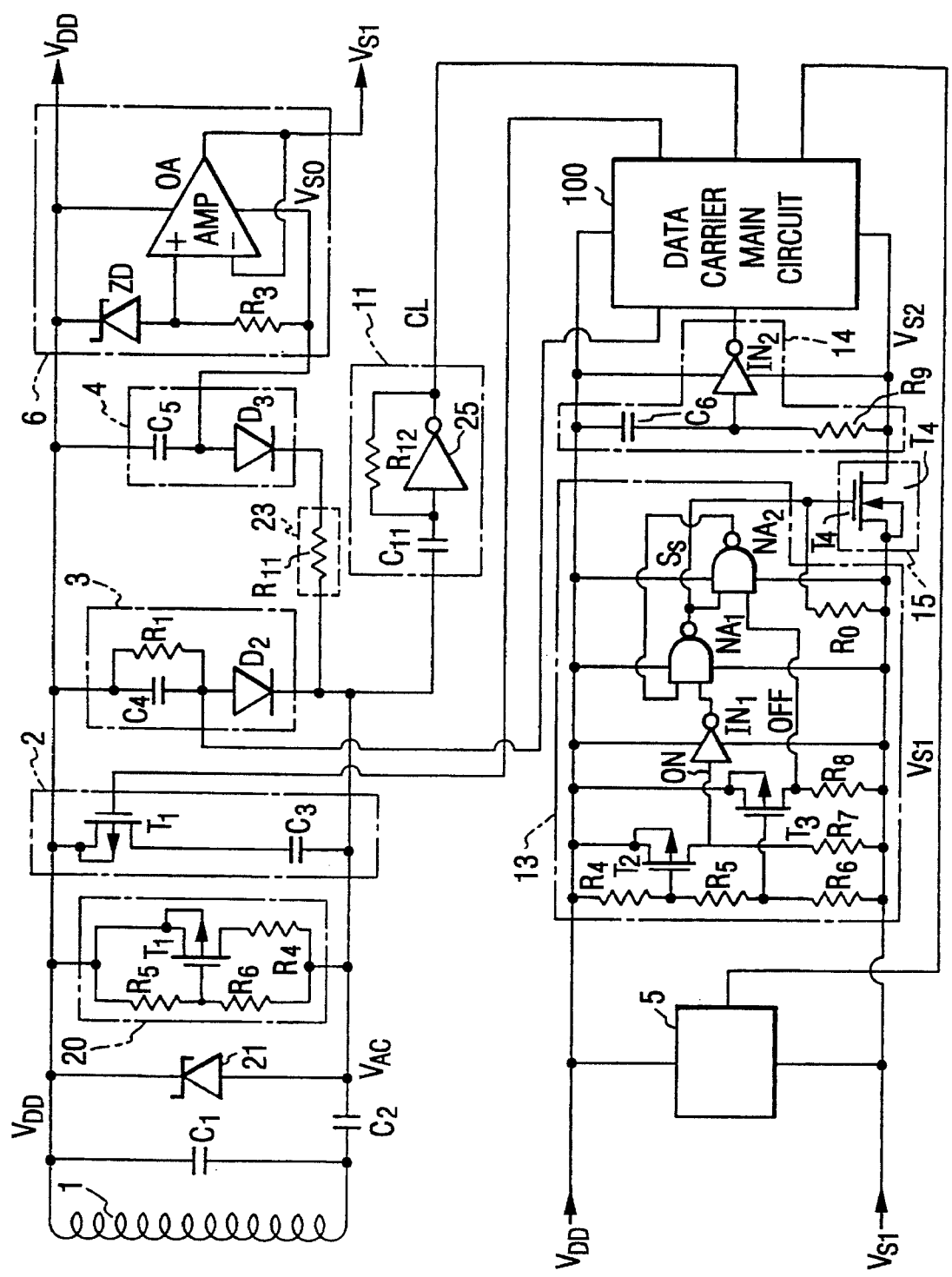
FIG. 8 is a circuit diagram showing the details of a data carrier according to the present invention.

FIG. 8 is a circuit diagram showing the details of a data carrier based on the arrangements of FIGS. 1 to 7. In FIG. 8, blocks each defined with a dotted line correspond to the components having like reference numerals in FIGS. 1 to 7.

In this embodiment, a coil 1 and a capacitor C1 form a resonance circuit. An end of the resonance circuit is connected to a reference potential line Vdd, and the other end thereof is connected to an induced voltage line Vac through a level shift capacitor C2.

A level shift diode D1 is connected between the reference potential line Vdd and the induced voltage line Vac. The diode D1 and capacitor C2 form a level shift circuit to provide a negative bias voltage to the induced voltage line Vac.

A modulator circuit 2 is formed of a capacitor C3 and a p-channel MOS transistor T1. The modulator circuit 2 receives a signal DATAout from a data carrier main circuit 100, to turn ON and OFF the transistor T1, thereby modulating the amplitude of an AC current flowing to the coil 1.

A wave detector circuit 3 is of a standard type including a diode D2, a capacitor C4, and a resistor R1. The wave detector circuit 3 provides a signal DATAin to the data carrier main circuit 100.

A rectifier circuit 4 has a series circuit of a diode D3 and a capacitor C5. A node between the diode D3 and the capacitor C5 provides a DC voltage Vs0. The rectifier circuit 4 is connected in series with a voltage-to-current converter 23 having a resistor Rll.

This embodiment also includes a clock generator circuit 11 and a nonlinear load circuit 20.

Figure 9:
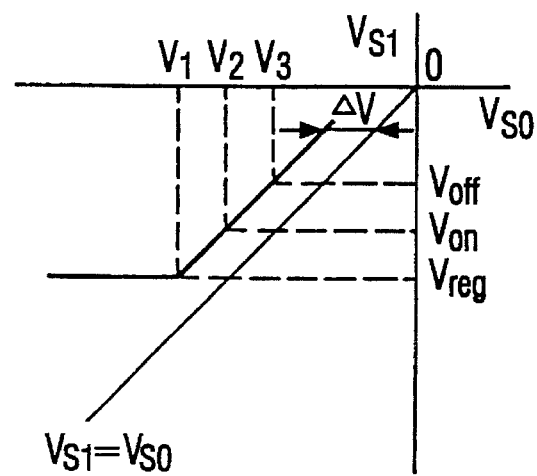
FIG. 9 is a graph explaining a constant voltage circuit and a voltage detector circuit employed by the embodiments of the present invention.

A constant voltage circuit 6 has a reference voltage source and a voltage-follower-connected operational amplifier OA. The reference voltage source has a resistor R3 and a constant voltage element DZ. An output voltage of the reference voltage source is impedance-converted by the voltage follower circuit and is supplied to a first power source line Vs1. The reference voltage source and operational amplifier OA receive the DC voltage Vs0 provided by the rectifier circuit 4. FIG. 9 is a graph showing a relationship between the output voltage Vs1 of the constant voltage circuit 6 and the DC voltage Vs0. When the absolute value of the DC voltage Vs0 (hereinafter, the magnitude of a voltage is expressed by its absolute value) is greater than a fixed value V1, the output voltage Vs1 will have a stabilized value Vreg, and when the DC voltage Vs0 becomes smaller than the fixed value V1, the output voltage Vs1 becomes Vs0 - $\Delta V$. Here, the $\Delta V$ is a loss voltage due to the operational amplifier OA. When the DC voltage Vs0 is at values V2 and V3 in a region below the fixed value V1, the output voltage Vs0 will be at values Von and Voff, respectively. A voltage detector circuit 13 will then operate as follows.

The voltage detector circuit 13 has a voltage divider circuit having three resistors R4, R5, and R6; a first amplifier having a p-channel MOS transistor T2 and a resistor R7; a second amplifier having a p-channel MOS transistor T3 and a resistor R8; and a memory circuit having an inverter IN1 and two NAND gates NA1 and NA2.

When the output voltage Vs1 of the constant voltage circuit 6 is small, two output voltages of the voltage divider circuit are each small. Accordingly, the gate voltage of each of the transistors T2 and T3 does not reach a threshold value. Outputs ON and OFF of the two amplifiers, therefore, are each at level LOW, and the output OFF of the second amplifier is held in the memory circuit. At this time, a switch control signal Ss provided by the voltage detector circuit 13 is at level LOW (logic 0) to turn OFF an n-channel MOS transistor T4 serving as a switch 15. A resistor R0 is a gate pulldown resistor for the transistor T4, to prevent a floating state irrespective of the condition of the gate of the transistor T4.

When the voltage Vs1 increases to the lowest operation level of the data carrier main circuit 100, the gate voltage of the transistor T3 exceeds the threshold value, so that the output OFF of the second amplifier changes to HIGH. At this time, the memory circuit holds the previous logic state, and therefore, the transistor T4 is kept OFF.

When the voltage Vs1 further increases to exceed a given voltage Von, the gate voltage of the transistor T2 exceeds the threshold value, and the output ON of the first amplifier becomes HIGH. As a result, the logic of the memory circuit is inverted, and the switch control signal Ss provided by the voltage detector circuit 13 becomes HIGH (logic 1) to turn ON the transistor T4. Then, power is supplied to a second power source line Vs2.

When the output voltage Vs1 of the constant voltage circuit 6 decreases from this state, the logic of the memory circuit will be unchanged even if the voltage Vs1 becomes below the given voltage Von and the output ON of the first amplifier changes to level LOW. If the voltage Vs1 decreases below the lowest operation voltage Voff, the output OFF of the second amplifier changes to LOW to invert the logic of the memory circuit. Then, the switch control signal Ss changes to LOW (logic 0) to turn OFF the transistor T4, and therefore, the supply of power to the power source line Vs2 is stopped to inactivate the data carrier main circuit 100.

As explained above, the switch control signal Ss provided by the voltage detector circuit 13 according to the embodiment has hysteresis characteristics. Accordingly, even if the output voltage Vs1 of the constant voltage circuit 6 slightly fluctuates, the switch control signal Ss will not frequently change its logic state. This prevents a malfunction of the data carrier main circuit 100.

When electric power induced in the coil 1 is small and the output voltage Vs0 of the rectifier circuit 4 is small, the operation of the constant voltage circuit 6 will become uncertain. If this happens, the operation of the voltage detector circuit 13 becomes also uncertain to destabilize the switch control signal Ss. When the power source voltage Vac is small, the output impedance of the NAND gate increases, so that the switch control signal Ss is controlled to LOW due to the pull-down resistor R0 at the gate of the transistor T4. Accordingly, no power is supplied to the power source line Vs2.

A power-on reset circuit 14 has a delay circuit and an inverter IN2. The delay circuit has a resistor R9 and a capacitor C6. As soon as power is supplied to the power source line Vs2, the inverter IN2 provides an initialization pulse of level LOW to initialize logic circuits of the data carrier main circuit 100. As a result, the main circuit 100 is put in a standby state. Thereafter, communication is carried out by modulating AC magnetic fields as explained before.

The clock signal generator circuit 11 has a capacitor Cl1, an inverter 25, and a bias resistor R12 for the inverter 25. The circuit 11 shapes the voltage Vac into a rectangular wave serving as a clock signal CLOCK.

Figure 10:
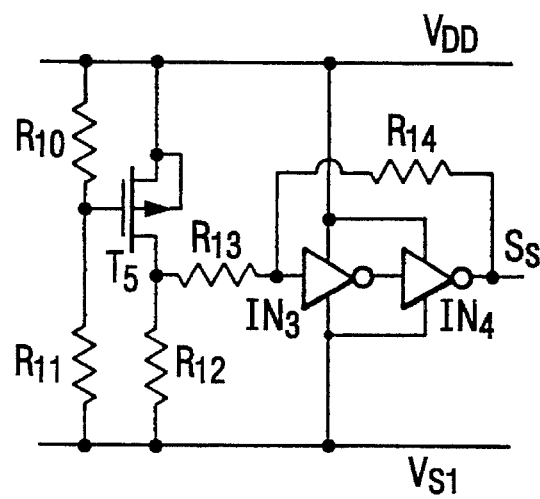
FIG. 10 is a circuit diagram showing an example of a voltage detector circuit according to the present invention.

FIG. 10 is a circuit diagram showing another example of the voltage detector circuit 13 having hysteresis characteristics according to the present invention. This example includes a voltage divider circuit having two resistors R10 and R11; an amplifier having a p-channel MOS transistor T5 and a resistor R12; and a Schmitt trigger circuit having two resistors R13 and R14 and two inverters IN3 and IN4.

Figure 11:
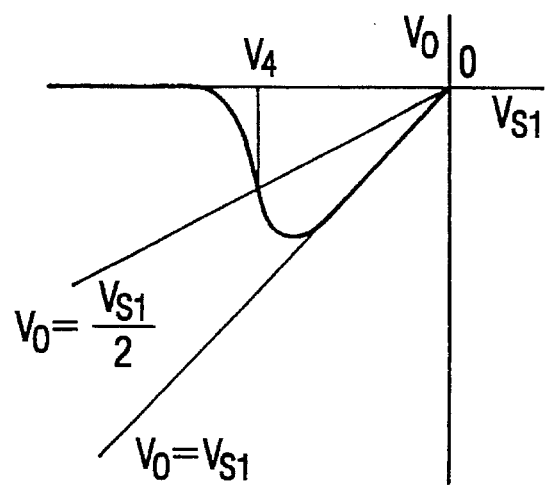
FIG. 11 is a graph explaining the voltage detector circuit of FIG. 10.

The voltage detector circuit 13 works on the output voltage Vs1 of the rectifier circuit 4 or of the constant voltage circuit 6. The voltage divider circuit divides the power source voltage Vs1 and provides an output voltage, which is inverted and amplified by the amplifier. FIG. 11 is a graph showing a relationship between the power source voltage Vs1 and the output voltage Vo of the amplifier. The output voltage Vo is equal to the power source voltage Vs1 when the power source voltage is small. When the power source voltage Vs1 increases such that the output voltage of the voltage divider circuit exceeds the threshold voltage of the transistor T5, the output voltage Vo rapidly decreases. When the power source voltage Vs1 further increases, the output voltage Vo becomes 0. When the output voltage Vo of the amplifier changes along a curve shown in the figure, the Schmitt trigger circuit is inverted around an intersection between the curve and a segment of Vo =Vs½. At the intersection, the power source voltage Vs1 =V4. As a result, the logic of the switch control signal Ss is inverted to turn ON or OFF the switch 15. The Schmitt trigger circuit has hysteresis characteristics that are determined by a ratio of the resistors R13 and R14. Accordingly, as explained with reference to FIG. 8, the switch 15 will not be frequently turned ON and OFF even if the power source voltage Vs1 fluctuates slightly. This results in stabilizing the power source switching operation.

A rewrite voltage for the memory circuit 9 formed of the MONOS EEPROM in the data carrier main circuit 100 of the data carrier 200 according to the present invention is, for example, below 10 V. The voltage decision circuit 5 compares an input voltage with a preset value, and if the input voltage is greater than the preset value, provides a signal for enabling a data rewrite operation of the memory circuit 9 in the data carrier main circuit 100.

The operation enabling voltage for the memory circuit 9 set in the voltage decision circuit 5 is, for example, 2.5 V. The voltage level to turn ON the poweron reset circuit 14 set in the voltage detector circuit 13 is, for example, 1.5 V. The voltage level to turn OFF the power-on reset circuit 14 set in the voltage detector circuit 13 is, for example, 1.2 V. In an initial state, the switch 15 is OFF and the power-on reset circuit 14 is also OFF.

When the input voltage gradually increases to exceed 1.5 V, the voltage detector circuit 13 provides an ON signal to turn ON the power-on reset circuit 14. As a result, the control circuit 10 is reset. The control circuit 10 may read a command but cannot rewrite the memory circuit 9.

When the input voltage exceeds 2.5 V, as precisely explained with reference to FIG. 1 the voltage decision circuit 5 provides a rewrite enable signal to the memory circuit 9. Accordingly, the control circuit carries out a rewrite operation.

When the input voltage decreases below 1.2 V, the voltage detector circuit 13 provides an OFF signal to turn OFF the switch 15. Accordingly, the write operation of the memory circuit 9 is stopped.

According to the electromagnetic coupling data carrier of this embodiment, a power source voltage lower than the lowest operation voltage of logic circuits will never be supplied to the logic circuits. At every start of supply of the power source voltage to the logic circuits, the logic circuits are initialized. This prevents malfunctions of the logic circuits. Since the ON/OFF operations of the power source for the logic circuits have hysteresis characteristics, a stabilized voltage is supplied to the logic circuits even if the power source voltage slightly fluctuates. As a result, the electromagnetic coupled data carrier incorporating the electrically erasable nonvolatile memory and rewrite control circuit for the memory never causes malfunctions of the logic circuits or the erroneous writing of the nonvolatile memory. In this way, the present invention provides an electromagnetic coupled data carrier having no battery and capable of carrying out the noncontact read and rewrite operations of a memory.

An electromagnetic coupled mechanism for transmitting data between the data carrier 200 according to the present invention and the fixed facilities 150 will be explained.

Generally, electromagnetic noncontact data carriers are classified into those having a battery and those having no battery. They are also classified into those that allow only a data flow from the data carriers to the fixed facilities and those that allow bidirectional data flows between the data carriers and the fixed facilities. For the data carriers having no battery and carrying out bidirectional data communication, the fixed facilities must provide a strong AC magnetic field to supply electric power to the data carriers. At the same time, the fixed facilities modulate the AC magnetic field, to transmit data (or control signals) to the data carriers. Since electromagnetic coupling is realized by mutual inductance between two coils, a secondary induction voltage on the data carrier widely fluctuates depending on a distance between the fixed facilities and the data carrier. Accordingly, to supply sufficient power to a distant data carrier, the fixed facilities (a primary coil) must have a sufficiently large current. This means that, when the data carrier is brought close to the fixed facilities, a very large voltage is induced in the coil (secondary coil) of the data carrier. In consideration of this, capacitors and semiconductor elements incorporated in the data carrier must have a large withstand voltage. Alternatively, a zener diode must be connected in parallel with the secondary coil to limit an increase in the voltage.

Increasing the withstand voltage of each element of the data carrier will increase the size of the element, to thereby increase the size of the data carrier. In addition, special production processes are needed to increase the withstand voltage of semiconductor ICs. This greatly increases the cost of the data carrier.

When the zener diode serving as a voltage clamper to cut an excessive voltage is connected in parallel with the secondary coil, a problem happens when transmitting data from the fixed facilities to the data carrier by modulating the amplitude of an AC electromagnetic field generated by the fixed facilities. When the data carrier is brought close to the fixed facilities, a peak of an induced voltage on the secondary side is cut to lose the amplitude modulated data. To avoid this, the maximum of the AC electromagnetic field produced by the fixed facilities may be limited. This, however, shortens a communication possible distance. This problem may be avoidable by modulating the AC electromagnetic field according to a 100% AM modulation method, an FSK method, or a PSK method. These methods, however, stop a system control clock signal or disturb the phases of the clock signal when generating the clock signal according to the AC electromagnetic field.

The problem of the excessively high voltage in the current coupling noncontact data carriers occurs also in the data carriers having a battery that eliminates the need of external power supply. Namely, a relationship between the magnitude of a data carrying AC electromagnetic field and the withstand voltage of each element of the data carrier as well as a relationship between the voltage clamp and distance in which communication is vositnutle, limit the design of the data carrier.

The present invention provides an electromagnetic coupled data carrier that solves these problems. The data carrier of the present invention secures a stable operation even at a distant location away from fixed facilities that provide a sufficiently strong AC electromagnetic field. When the data carrier is brought close to the fixed facilities, the data carrier suppresses the voltage induced in a secondary coil to an allowable level. The data carrier is capable of stably receiving data transmitted from the fixed facilities, which prepares the data by modulating the amplitude of an AC electromagnetic field, irrespective of the depth of modulation.

Figure 13:
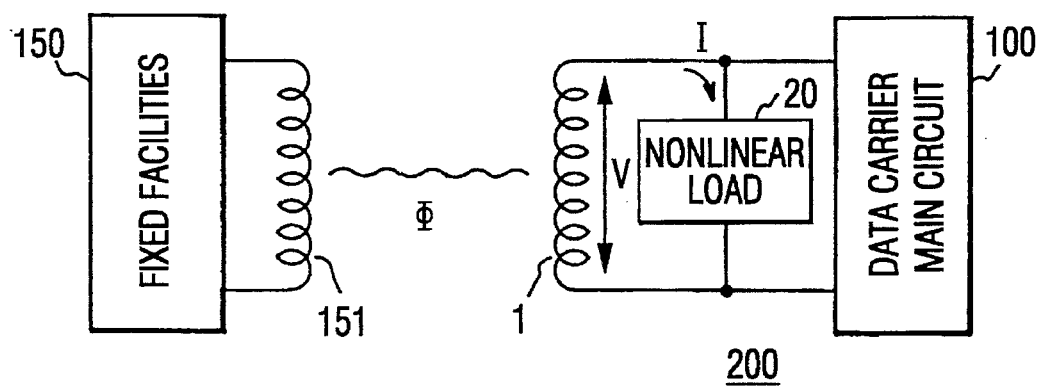
FIG. 13 is a block diagram showing a relationship between fixed facilities and a data carrier according to the present invention.

FIG. 13 shows an electromagnetic coupling data carrier according to the present invention. The data carrier incorporates a nonlinear load for a secondary coil. Data and electric power are transmitted from fixed facilities 150 to the data carrier 200 via an AC electromagnetic field generated by the fixed facilities 150. The data carrier 200 has the coil 1 in which electric power is induced due to the AC electromagnetic field, and the nonlinear load 20 equivalently connected in parallel with the coil 1.

Figure 14:
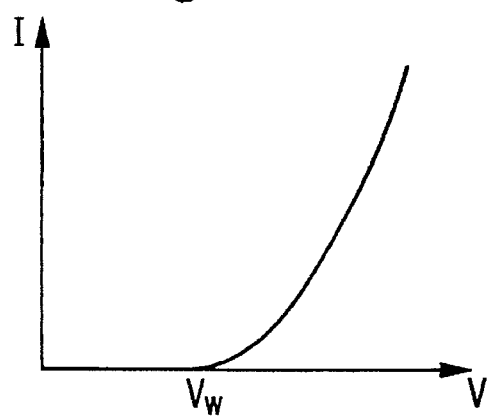
FIG. 14 is a graph showing the voltage to current characteristics of a nonlinear load circuit according to the present invention.

The nonlinear load 20 is a 2-terminal passive element. FIG. 14 is a graph showing a voltage V applied to the two terminals and a current I produced due to the voltage. When the applied voltage is small, no current flows. When the applied voltage exceeds a given voltage Vw, a current gradually flows. Thereafter, as the voltage increases, the current also increases. It is preferable that the voltage Vw is set to be larger than a lowest voltage required for stably operating the data carrier.

Generally, semiconductor devices have nonlinearity to some extent. Such intrinsic nonlinearity never provides the voltage-current characteristics appropriate for the purpose of the present invention. The present invention does not rely on such spontaneous nonlinearity.

When the data carrier 200 is brought close to an antenna coil 151 of the fixed facilities 150 or when a current flowing to the antenna coil 151 is strengthened, electric power induced in the secondary coil 1 in the data carrier 200 will increase beyond a required level. In this case, a current flowing through the nonlinear load 20 increases. This delays the terminal voltage of the secondary coil 1 exceeding the withstand voltage of each element of the data carrier 200.

When the data carrier 200 is at a distance away from the antenna 151 of the fixed facilities 150, electric power induced in the secondary coil 1 of the data carrier drops. Then, no current will flow through the nonlinear load 20. This delays a decrease in a voltage supplied to the data carrier 200.

In this way, the range of an AC electromagnetic field supplied to the data carrier 200 is expanded.

This embodiment will be explained in detail with reference to the drawings.

Figure 16:
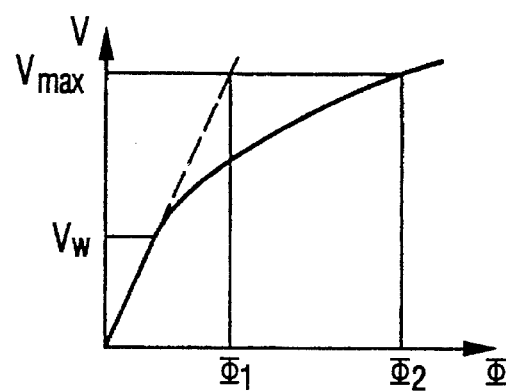
FIG. 16 is a graph showing a relationship between the strength of an AC electromagnetic field Φ and a voltage V induced in a data carrier coil, according to the present invention.

FIG. 13 shows a principle relationship between the fixed facilities 150 and the data carrier 200 according to the embodiment of present invention. In the figure, a current flowing through the antenna coil (primary coil) 151 of the fixed facilities 150 generates an AC electromagnetic field $\Phi$. The coil (secondary coil) 1 of the data carrier 200 generates an electromotive force whose strength is proportional to the strength of the AC electromagnetic field $\Phi$. The electromotive force produces a voltage V to a data carrier main circuit 100 and the nonlinear load 20 having the characteristics of FIG. 14. FIG. 16 is a graph showing a relationship between the AC electromagnetic field $\Phi$ and the voltage V. Generally, a data carrier is designed to minimize power consumption, to efficiently use electric power induced in a secondary coil. If there is no nonlinear load 20, the voltage V will be proportional to the magnitude of the AC electromagnetic field $\Phi$, as indicated with a dotted line in FIG. 16. According to this embodiment having the nonlinear load 20, the voltage V linearly increases similar to the case of having no nonlinear load, when the magnitude of the AC electromagnetic field $\Phi$ is small. As the AC electromagnetic field $\Phi$ increases, the voltage V exceeds a given voltage Vw. Then, a current I starts to flow to the nonlinear load 20. As a result, a ratio of a change in the voltage V to a change in the AC electromagnetic field $\Phi$ gradually drops, as indicated with a continuous line in FIG. 16. If there is no nonlinear load, the voltage V reaches the withstand voltage Vmax of an IC contained in the data carrier main circuit 100 with the AC electromagnetic field being at Φ1. When the nonlinear load 20 is employed, the voltage V will not exceed the withstand voltage Vmax until the AC electromagnetic field reaches a larger value Φ2. In this way, the usable range of the data carrier is greatly expanded.

Figure 15:
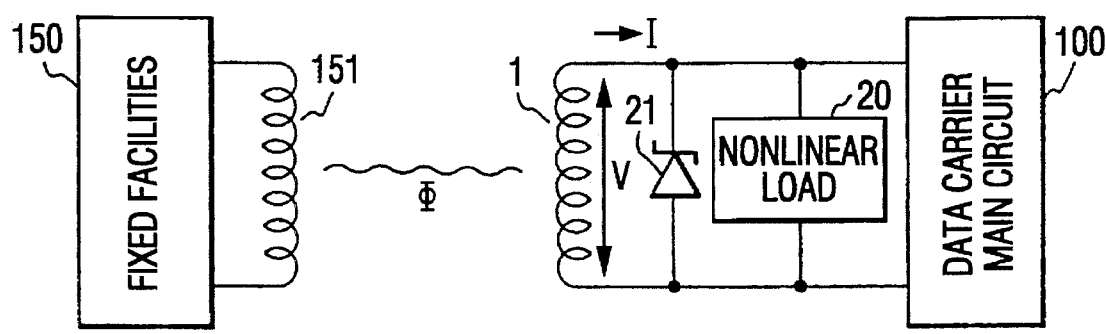
FIG. 15 is a circuit diagram showing another embodiment of the present invention.
Figure 17:
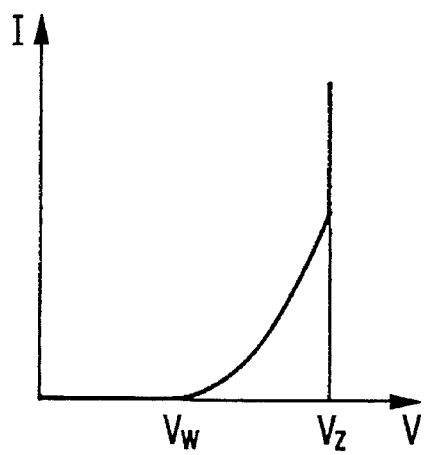
FIG. 17 is a graph showing the voltage to current characteristics of a nonlinear load circuit.
Figure 18:
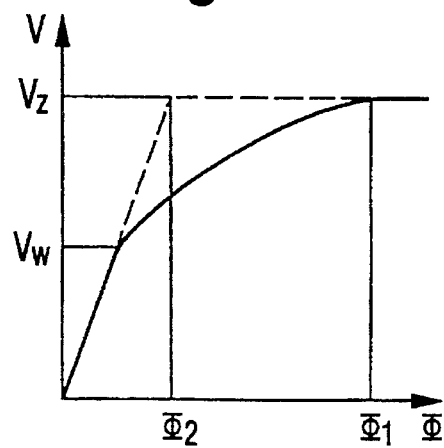
FIG. 18 is a graph showing a relationship between the strength of an AC electromagnetic field Φ and a voltage V induced in a data carrier coil, according to the present invention.

FIG. 15 shows a data carrier 200 according to an embodiment of the present invention. The data carrier has a coil 1 and a zener diode 21. The zener diode is connected in parallel with the coil 1, to clamp a peak of an induced voltage. FIG. 17 is a graph showing a relationship between a voltage V and a current I induced in the secondary coil 1. A voltage Vz in the graph is a clamp voltage of the zener diode 21. When the voltage V reaches the clamp voltage, the current I suddenly increases to clamp an increase in the voltage. FIG. 18 is a graph showing a relationship between an AC electromagnetic field Φ emitted from a primary coil 151 of fixed facilities 150 shown in FIG. 15 and the voltage V induced in the secondary coil 1 of the data carrier 200. The induced voltage V is represented with a continuous curve in the graph. When the AC electromagnetic field Φ is small, the relationship is the same as that of FIG. 13. As the AC electromagnetic field Φ increases, the voltage V increases. When the voltage V reaches the zener voltage, it is clamped so that it will never exceed the zener voltage Vz. This arrangement enables data transmission by amplitude modulation until the lowest amplitude of the AC electromagnetic field Φ exceeds a given value Φ1.

If the arrangement of FIG. 15 has no nonlinear load 20, the induced voltage V of the secondary coil 1 linearly changes as indicated with a dotted line in the graph, and at a relatively low AC electromagnetic field Φ2, the voltage V reaches the zener voltage Vz and is clamped thereat. In this case, data transmission by amplitude modulation is disabled when the lowest amplitude of the AC electromagnetic field Φ reaches or exceeds a value Φ2. Accordingly, it is necessary to restrict the magnitude of an excitation current in the primary coil 151 of the fixed facilities 150. This reduces a data transmission possible range of the data carrier. As explained above, the present invention is effective not only to relax the withstand voltage of each element of the data carrier but also to improve the communication conditions of the amplitude modulation system.

Figure 12:
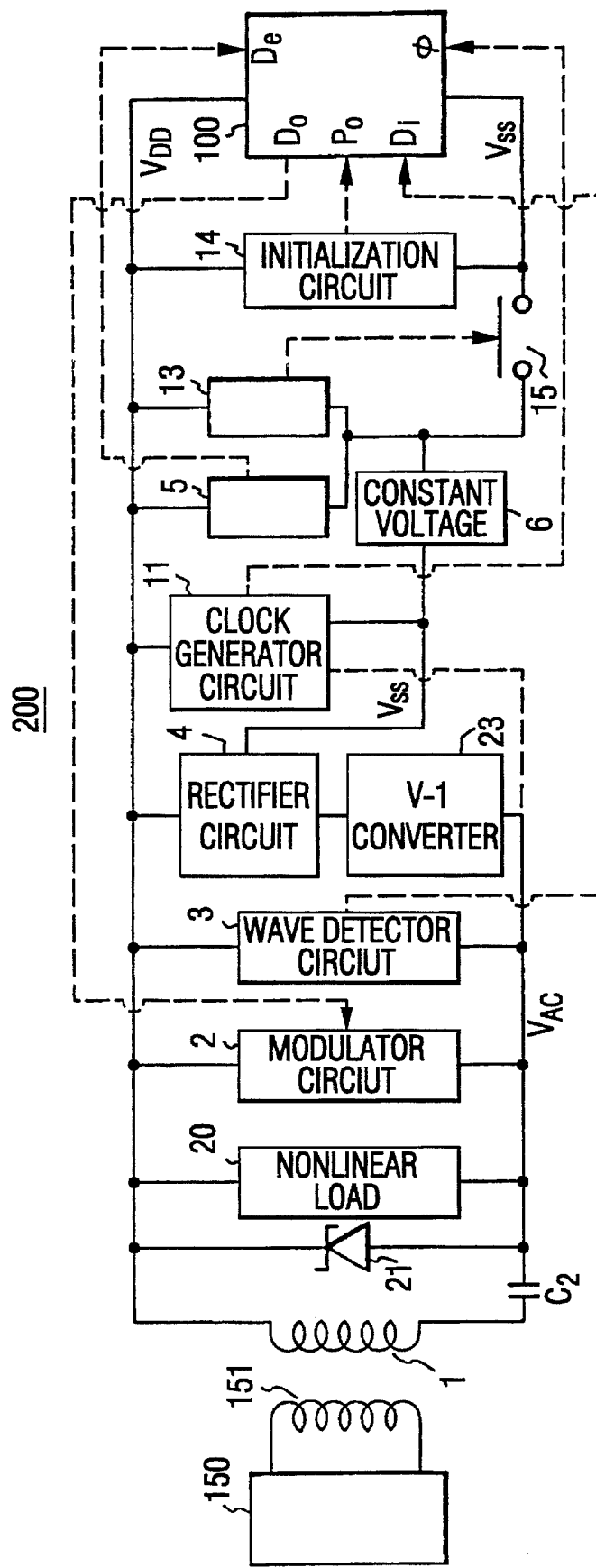
FIG. 12 is a block diagram showing an electromagnetic coupling data carrier having a signal demodulator circuit according to the present invention.

FIG. 12 shows a data carrier according to an embodiment of the present invention. Components of this embodiment are shown in FIG. 8.

An end of a secondary coil 1 is connected to a line VDD, which provides reference potential for elements of the data carrier 200. The other end of the coil 1 is connected to an end of a level shift capacitor C2. The other end of the level shift capacitor C2 is connected to a line Vac for transmitting an electric power signal. A zener diode 21 may be used with the capacitor C2, to shift the level of an AC voltage induced in the secondary coil 1 and generate an electric power signal. When the signal on the line Vac exceeds a zener voltage, the voltage is clamped.

The line Vac is connected to a rectifier circuit 4, a wave detector circuit 3, and a modulator circuit 2. At the same time, as shown in FIG. 8, the line Vac is connected to a nonlinear load 20 having a transistor T2 and resistors R4, R5, and R6. The line Vac is also connected to a clock generator circuit 11, which provides a clock signal CLOCK serving as a clock signal ϕ for a data carrier main circuit 100.

An output voltage Vss of the rectifier circuit 4 is used as a negative power source for the data carrier main circuit 100.

The wave detector circuit 3 detects amplitude modulated data superimposed on an AC voltage induced in the secondary coil 1 and provides an input signal Di for the data carrier main circuit 100. The modulator circuit 2 transmits data of the data carrier 200 to an immobile terminal 150. Namely, the modulator circuit 2 receives an output signal D0 from the data carrier main circuit 100, and the signal D0 switches the transistor T1 to modulate a load current flowing to the secondary coil 1. As shown in FIG. 8, the nonlinear load 20 divides the signal Vac with the resistors R5 and R6 having large resistance values, to provide a gate voltage to the transistor T2. When a peak voltage of the signal Vac exceeds a predetermined value Vw, the gate voltage exceeds the threshold voltage of the transistor T2, to turn ON the transistor T2. Then, a current flows to the resistor R4 to prevent an excessive increase in the voltage of the signal Vac.

Figure 19A:
FIGS. 19(a), 19(b), 19(c) and 19(d) show various nonlinear load circuits employable for a data carrier according to the present invention.
Figure 19B:
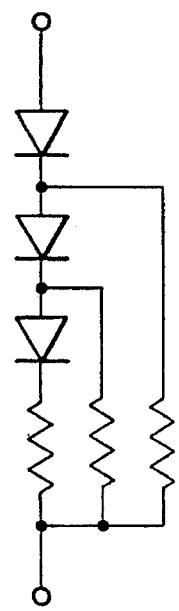
Figure 19C:
Figure 19D:
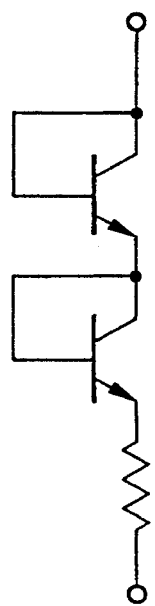

FIG. 19(a), 19(b), 19(c) and 19(d) show circuits for realizing the nonlinear load 20 employed by the data carrier 200 according to the present invention. FIGS. 19(a) and 19(b) employ a combination of diodes and resistors. These circuits utilize the nonlinear forward characteristics of the diodes. FIG. 19(c) employs a combination of a zener diode and a resistor. A zener voltage is set to be equal to the above-mentioned voltage Vw. FIG. 19(d) employs a combination of bipolar transistors and a resistor.

The current characteristics of each of the nonlinear loads shown in FIGS. 8, 19(a), 19(b) 19(c) and 19(d) are not symmetric with respect to a voltage applying direction. These circuits are proper to shift the waveform of a voltage induced in the secondary coil 1 so that the potential of an electric power signal is always biased to the negative or positive side with respect to reference potential, as in the case of FIG. 8. The circuits shown in FIGS. 19(a), 19(b), and 19(d) may sufficiently function even if they are directly connected in parallel with the secondary coil 1.

As explained above, an electromagnetic coupled data carrier according to the present invention reduces consumption of electric power induced in a secondary coil as small as possible when the strength of an AC electromagnetic field emitted from fixed facilities is weak, so that a sufficiently large voltage is supplied to elements of the data carrier. When the strength of the AC electromagnetic field is too strong and induces excessive electric power in the secondary coil, the data carrier of the present invention causes a current to flow to a nonlinear load, so that the elements of the data carrier will not receive the excessive power. Accordingly, the present invention greatly expands an allowable range of an AC electromagnetic field with respect to the withstand voltage of each element of the data carrier. As a result, the data carrier can stably receive data from fixed facilities even when the data carrier is distanced away from the fixed facilities or very close to the same. According to the present invention, each element of the data carrier is not required to have an unreasonably high withstand voltage, so that the data carrier may be compact and fabricated with inexpensive parts, to thereby reduce the cost thereof.

As explained above, the data carrier 200 according to the present invention carries out bidirectional data communication with respect to the fixed facilities 150 by binary-modulating an AC magnetic field that provides electricity and clock frequencies. There are several techniques for achieving the binary modulation, such as frequency modulation, phase modulation, and amplitude modulation. The best way is the binary amplitude modulation because it involves a simple demodulator circuit and stable clock frequencies. The amplitude modulation, however, has some limits on the depth of modulation. When the data carrier is far from the fixed facilities, an AC magnetic field reaching the data carrier from the fixed facilities will be weak. To surely extract a clock frequency from the weak magnetic field, the depth of amplitude modulation must be as shallow as possible. On the other hand, a wave detector circuit serving as a demodulator circuit of the data carrier correctly demodulates data if a ratio between two amplitudes is large. When designing a data carrier, these two factors must be well balanced.

As explained before, the electromagnetic coupled data carrier 200 has a resonance circuit, which is formed by connecting a capacitor in parallel with a power receiving coil 1. The resonance circuit works to increase the voltage amplitude of induced electric power, to thereby increase the output impedance of the power reception circuit. Accordingly, when large electric power is induced in the coil 1, the coil 1 supplies a large current to the load circuit, to cause a large voltage drop due to the output impedance. Accordingly, the terminal voltage of the coil 1 is not so large as expected. When the electric power induced in the coil 1 temporarily drops due to amplitude modulation of an AC magnetic field, a current for the elements of the data carrier 200 is supplied from the filtering capacitor of the power source circuit. Namely, the resonance circuit does not supply the current. Accordingly, no voltage drop occurs due to the output impedance of the resonance circuit. The terminal voltage of the coil 1, therefore, does not drop as expected. In this way, even if the amplitude of an AC magnetic field for supplying electric power is modulated, the terminal voltage of the coil 1 of the data carrier 200 will not have amplitude modulation of sufficient depth. There is a requirement, therefore, to effectively convert a change in the amplitude of an AC magnetic field emitted from the fixed facilities 150 into a change in the amplitude of the terminal voltage of the coil 1 of the data carrier 200. To meet the requirement, the present invention connects the current-to-voltage converter element 23 in series with the rectifier circuit 4, as shown in FIGS. 8 and 12.

In FIG. 8, the electromagnetic coupled data carrier 200 has no power source and is operated with electric power induced in the coil 1 in response to an AC magnetic field emitted from the fixed facilities 150. The data carrier 200 produces a clock signal according to the frequency of the AC magnetic field. The data carrier 200 incorporates the electrically erasable programmable nonvolatile memory circuit 9. The data carrier further has the power source circuit 4 for rectifying and filtering the AC electric power induced in the coil 1, to provide a DC voltage, and the wave detector circuit 3 for detecting a signal that has been overlapped on the AC electric power by amplitude modulation. The resistor R11 serving as the current-to-voltage converter 23 is connected in series with the rectifier circuit 4 that forms the power source circuit 4.

Part of electricity supplied from the resonance circuit, which involves the coil 1 and capacitor C1, to the elements of the data carrier 200 is converted into a voltage by the current-to-voltage converter 23. The converted voltage is added to the terminal voltage of the coil 1. Accordingly, when a large AC magnetic field induces large electricity in the coil, the terminal voltage of the coil is increased.

In FIG. 8, the coil 1 and capacitor C1 form the parallel resonance circuit. An end of the resonance circuit is connected to the reference potential line VDD, and the other end is connected to the voltage doubler line Vac. Between the voltage doubler line Vac and the reference potential line VDD, there are arranged the modulator circuit 2 having the level shift diode D1, capacitor C3, and p-channel MOS transistor T1; the wave detector circuit 3 having the diode D2, capacitor C4, and resistor R1; and the rectifier circuit 4 having the resistor R11 serving as the current-to-voltage converter 23, rectifying diode D3, and filtering capacitor C5.

The modulator circuit 2 changes a circuit impedance in response to an output signal DATAout from the data carrier main circuit 100, to modulate the amplitude of an AC current flowing to the coil 1. As a result, an AC magnetic field around the coil 1 is changed to transmit data to the fixed facilities 150. The wave detector circuit 3 detects a change in an AC voltage induced in the coil 1 due to a change in the amplitude in an AC magnetic field emitted from the fixed facilities 150. The wave detector circuit 3 then extracts input data DATAin, which is transmitted to the data carrier main circuit 100. The details of this process will be explained later.

The rectifier circuit 4 provides a DC output voltage Vs0, which is stabilized by the constant voltage circuit 6, which provides a source voltage Vs1. The source voltage Vs1 is supplied to the voltage detector circuit 13 and the inverter 25 of the clock circuit 11. The voltage is also supplied to the p-channel MOS transistor that forms the switch 15. The resistor R12 is connected between an input and an output of the inverter 25, to form a self-bias amplifier. An AC voltage component of the voltage doubler line vac is transferred to the amplifier through the capacitor C11. The amplifier saturation-amplifies the voltage component, to form a rectangular wave as a clock signal CL. The clock signal is used as a timing signal of the data carrier main circuit 100.

The gate of the transistor T4 is pulled up to the source voltage Vs1 by the resistor R0 and is controlled according to the output signal Ss of the voltage detector circuit 13. When the voltage detector circuit 13 determines that the source voltage Vs1 is greater than the lowest operation voltage of each logic circuit, the level of the signal Ss becomes LOW to turn ON the transistor T4. As a result, power is supplied to the power source Vs2 of the data carrier main circuit 100 connected to the drain of the transistor T4. Then, the data carrier main circuit 100 starts to operate. At first, the logic circuits of the main circuit 100 are initialized by the built-in initialization circuit and are put in a communication standby state. In the data carrier having the above-mentioned arrangement, a way of detecting data transmitted from the fixed facilities by amplitude modulation will be explained.

Figure 20:
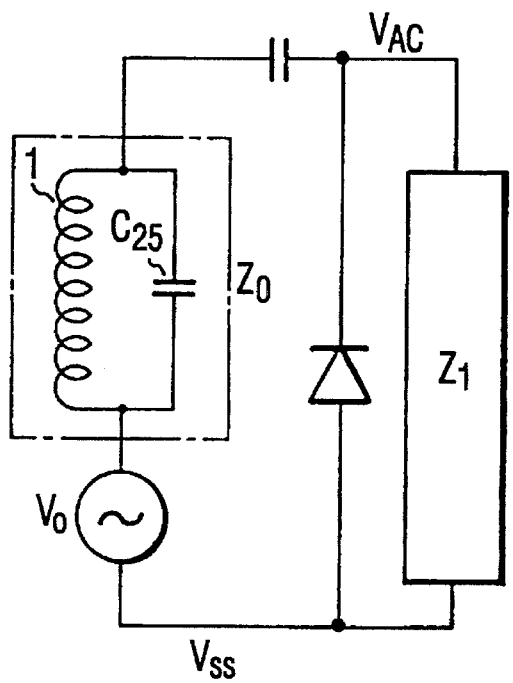
FIG. 20 is a block diagram showing an example of a current-to-voltage converter shown in FIG. 12, according to the present invention.

FIG. 20 is a circuit diagram showing an impedance arrangement and a voltage distribution inside the data carrier 200. An AC voltage of an electromotive force induced in the resonance circuit formed of the coil 1 and a capacitor C25 is V0 (a P—P value). The resonance circuit has a parallel impedance of Z0. The load circuits of the data carrier 200 have an impedance of Z1 in total. A peak value in the voltage doubler line Vac that supplies electricity to the load circuits of the data carrier 200 is expressed by the following equation 1. It is supposed that a voltage loss of the level shift circuit is negligible.

$$vac = v0 \cdot z1/(z0+z1) \qquad (1)$$

Figure 21:
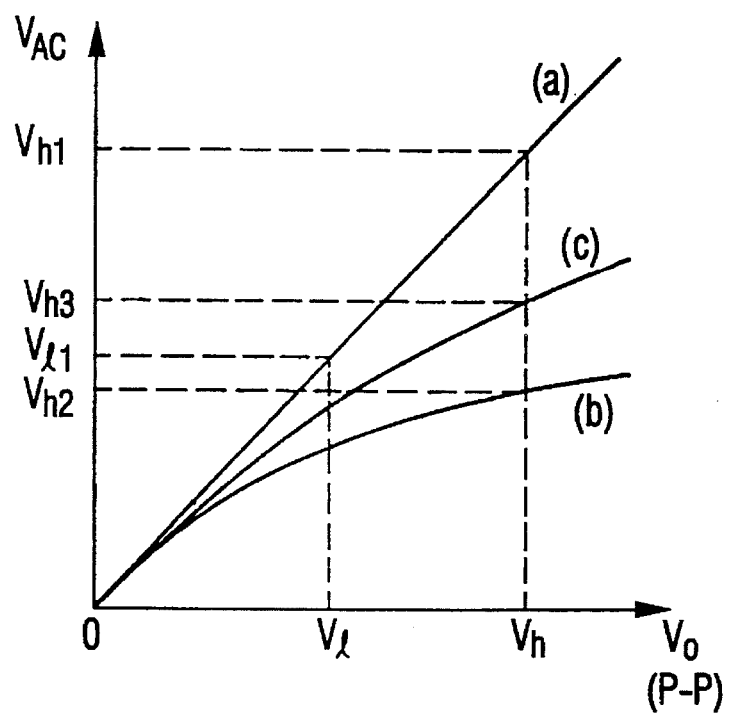
FIG. 21 is a graph showing a relationship between voltages V0 and Vac related to the operation of the current-to-voltage converter.
Figure 22A:
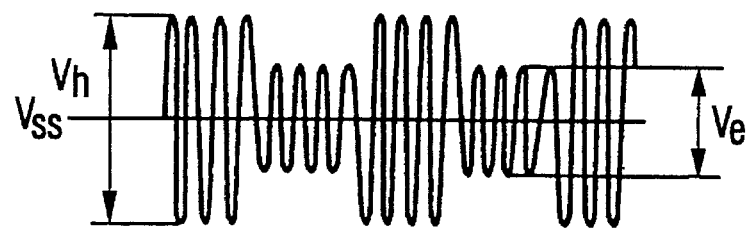
FIGS. 22(a), 22(b), 22(c) and 22(d) show voltage waveforms related to the operation of the current-to-voltage converter.
Figure 22B:
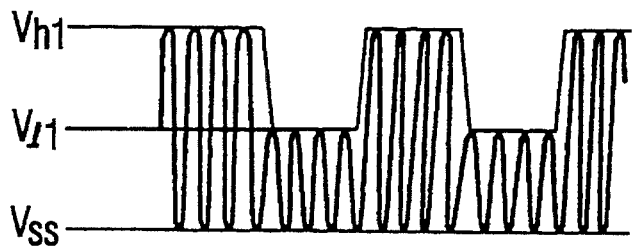

If the impedance Z1 of the load circuits is sufficiently larger than the impedance Z0 of the resonance circuit, Vac=V0 according to the equation 1. At this time, a relationship between these voltages will follow a segment (a) in FIG. 21. Two values Vh and Vl for the AC voltage V0 correspond to peak values Vhl and Vll for the voltage doubler line Vac. FIG. 22(a) is a waveform showing changes in the AC voltage V0. FIG. 22(b) shows a waveform of the voltage of the voltage doubler line Vac corresponding to the waveform of FIG. 22(a). The wave detector circuit detects an envelope of the peak values on the voltage doubler line Vac. Accordingly, the amplitude of an output signal of the wave detector circuit corresponds to a difference between the values Vhl and Vll. Namely, the output signal has a sufficient magnitude.

Figure 22C:
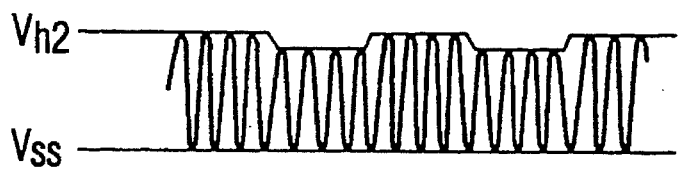

Most parts of the data carrier 200 are made of semiconductor so that the impedance Z1 of the load circuits rapidly drops as the source voltage increases. Since the power source voltage is considered to be equal to the peak value of the voltage doubler line Vac, the equation 1 will correspond to a curve (b) of FIG. 21 in an actual data carrier. Namely, the peak value of the voltage doubler line Vac slowly increases as the AC voltage V0 increases. If the resistor R11 of FIG. 8 is short-circuited, the peak value of the voltage doubler line Vac will be Vh2 with the AC voltage V0 being at Vh, as shown in FIG. 21. If the AC voltage V0 rapidly drops to V1, the load circuits except the modulator circuit 2 and wave detector circuit 3 are disconnected from the voltage doubler line Vac because the filtering capacitor C5 of the rectifier circuit 4 holds the voltage Vh2 to apply an inverse bias voltage to the rectifying diode D3 of the rectifier circuit. Accordingly, the peak value of the voltage doubler line Vac will substantially correspond to the segment (a) of FIG. 21. The peak value, however, never exceeds the value Vh2, so that the peak value for the AC voltage V1 becomes close to the Vh2. Namely, the peak value of the voltage doubler line Vac will be substantially constant as shown in FIG. 22(c), even if the amplitude of the AC voltage V0 is modulated as shown in FIG. 22(a) by modulating the amplitude of an AC magnetic field. It will be impossible to detect signals from the waveform of FIG. 22(c).

Figure 22D:
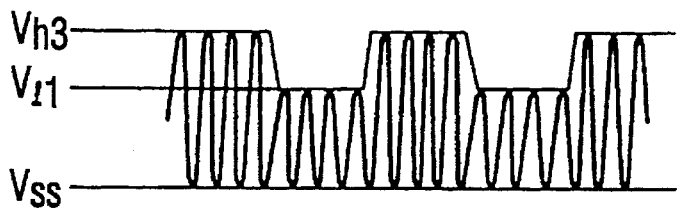

When the resistor R11 is inserted to the rectifier circuit 4, a relationship between the AC voltage V0 and the peak value of the voltage doubler line Vac will correspond to a curve (c) of FIG. 21. As a result, the two values Vh and V1 for the AC voltage V0 correspond to peak values Vh3 and Vl1 according to the curve (c) and segment (a). FIG. 22(d) shows a voltage waveform of the voltage doubler line Vac at this moment. The wave form detector circuit 3 detects such binary voltage levels and provides a detected output whose amplitude correspond to a difference between the values Vh3 and Vl1. The detected output is transferred as an input signal DATAin to the data carrier main circuit 100. In this way, a large amplitude part is left in a compressed form, to enable data transmission.

The embodiment of FIG. 8 has been explained. In an actual data carrier, a resistor connected in series with a rectifier has a function of converting a current into a voltage. Any element having such current-to-voltage conversion function is employable. For example, an inductance element will do. A plurality of rectifying diodes may be connected in series to use the parasitic resistance thereof. The best current-to-voltage conversion means is to use the zener voltage of a zener diode. This means is included in the scope of the present invention.

As explained above, the electromagnetic coupling data carrier 200 having no power source according to the present invention is capable of converting a change in the amplitude of an AC magnetic field containing electric power and data emitted from the fixed facilities 150 into a change in an internal AC voltage. Accordingly, the fixed facilities 150 can transmit binary data to the data carrier by superimposing the data on an AC magnetic field by amplitude modulation. The depth of amplitude modulation is restricted in a predetermined range, so that AC magnetic field frequencies can be continuously supplied to the data carrier 200. This results in stabilizing a clock signal in the data carrier 200 and correctly operating logic circuits in the data carrier. Not only data and clock signals but also control commands can be sent from the fixed facilities to the data carrier 200, to selectively operate the data carrier. This improves the functions of the data carrier.

We claim:

1. A data carrier with no battery, comprising:

a reception coil for receiving an alternating current (AC) magnetic field emitted from at least a host facility providing an AC voltage;

a rectifier circuit for rectifying the AC voltage into a direct current (DC) source voltage;

a wave detector circuit for demodulating communication data superimposed on the AC voltage and for extracting input data;

a modulator circuit for generating reply data for the host facility according to data stored in the data carrier main circuit;

a transmission coil for generating an AC magnetic field according to the reply data;

a data carrier main circuit, including
      a MONOS EEPROM for storing the input data,
      data read means for reading output data from EEPROM,
      data write means for writing data to the EEPROM;
      a control circuit for writing and reading data to and from the EEPROM,
      a step-up circuit, when enabled, for increasing the source voltage to provide a rewrite voltage; and
      a voltage decision circuit for monitoring the source voltage, the voltage decision circuit being operative to enable the step-up circuit in response to a detected predetermined source voltage of a predetermined voltage level.

2. The data carrier according to claim 1, wherein the data carrier main circuit further comprises:

voltage control means for clamping the rewrite voltage below a predetermined value.

3. The data carrier according to claim 1 wherein the data carrier main circuit further comprises:

voltage control means for clamping the rewrite voltage below a predetermined value; and wherein the decision circuit includes means for determining whether or not the rewrite voltage for the MONOS EEPROM is greater than a predetermined value.

4. The data carrier according to claim 3, wherein the voltage decision circuit includes means for comparing the input voltage with the predetermined voltage level, and for providing an enable signal to rewrite data in the memory of the main circuit at times when the input voltage is higher than the predetermined voltage level.

5. The data carrier according to claim 1, wherein the data carrier main circuit comprises:

voltage supply means for supplying to the main circuit a write voltage and an erase voltage having different values.

6. The data carrier according to claim 1, wherein the data carrier main circuit comprises:

a voltage divider circuit for dividing the increased voltage into a write voltage and an erase voltage, and switching means for supplying one of the write voltage and erase voltage to the EEPROM.

7. The data carrier according to claim 1, wherein the data carrier main circuit comprises:

voltage supply means for providing different supply periods for a write voltage and an erase voltage supplied to the main circuit.

8. The data carrier according to claim 7, wherein the voltage supply means includes a timer.

9. The data carrier according to claim 1, further comprising:

a voltage detector circuit for determining the level of the source voltage provided by the rectifier circuit or the level of a constant voltage produced from the source voltage;

switching means controlled by the voltage detector circuit; and first and second circuit blocks connected to and disconnected from each other through the switching means, the first circuit block including the coil, rectifier circuit, and voltage detector circuit.

10. The data carrier according to claim 9 wherein the second block includes an initialization circuit for initializing the data carrier main circuit.

11. The data carrier according to claim 10, wherein the initialization circuit is a power-on reset circuit.

12. The data carrier according to claim 9, wherein the voltage detector circuit has two detection levels, the first detection level closing the switching means to supply the source voltage to the second circuit block, the second detection level opening the switching means to stop the supply of the source voltage to the second circuit block.

13. The data carrier according to claim 12, wherein the first detection level is higher than the second detection level of the voltage detector circuit.

14. The data carrier according to claims 9, wherein the data carrier main circuit comprises:

voltage supply means for supplying a write voltage and an erase voltage having different values to the main circuit.

15. The data carrier according to claim 9, wherein the data carrier main circuit comprises:

a voltage divider circuit for dividing the increased voltage into a write voltage and an erase voltage, and switching means for supplying one of the write voltage and erase voltage to the EEPROM.

16. The data carrier according to claim 9, wherein the data carrier main circuit has voltage supply means for providing different supply periods for a write voltage and an erase voltage supplied to the main circuit.

17. The data carrier according to claim 1, wherein the rewrite voltage for the MONOS EEPROM in the data carrier main circuit is lower than 10 V.

18. The data carrier according to claim 1, further comprising a nonlinear load connected to the reception coil.

19. The data carrier according to claim 18, wherein the nonlinear load is a combination of semiconductor elements and resistors.

20. The data carrier according to claim 1; further comprising a voltage-to-current converting element inserted in a rectified current path of the rectifier circuit for rectifying the AC voltage provided by the reception coil.

21. The data carrier according to claim 20, wherein the voltage-to-current converting element is a resistor.

22. The data carrier according to any one of claims 1 to 47, wherein the reception coil and the transmission coil is one and the same coil.

23. A data carrier with no battery, comprising:

a reception coil for receiving an alternating current (AC) magnetic field emitted from at least a host facility providing an AC voltage;

a rectifier circuit for rectifying the received AC voltage into a direct current (DC) source voltage;

a wave detector circuit for demodulating communication data superimposed on the received AC voltage and for extracting input data;

a data carrier main circuit, including
a MONOS EEPROM for storing the input data,
data read means for reading output data from EEPROM,
data write means for writing data to the EEPROM;

a transmission coil for generating an AC magnetic field according to reply data;

a modulator circuit for generating the reply data for the host facility according to data stored in the data carrier main circuit;

a voltage detector circuit for determining the level of the source voltage provided by the rectifier circuit or the level of a constant voltage produced from the source voltage;

switching means controlled by the voltage detector circuit; and first and second circuit blocks connected to and disconnected from each other through the switching means, the first circuit block including the coil, the rectifier circuit, and the voltage detector circuit.

24. The data carrier according to claim 23, wherein the second circuit block includes an initialization circuit for initializing the data carrier main circuit.

25. The data carrier according to claim 24, wherein the initialization circuit is a power-on reset circuit.

26. The data carrier according to claim 23, wherein the voltage detector circuit has two detection levels, the first detection level closing the switching means to supply the source voltage to the second circuit block, the second detection level opening the switching means to stop the supply of the source voltage to the second circuit block.

27. The data carrier according to claim 26, wherein the first detection level is higher than the second detection level.

* * * * *

UNITED STATES PATENT AND TRADEMARK OFFICE
CERTIFICATE OF CORRECTION

PATENT NO. : 5,521,590
DATED : May 28, 1996
INVENTOR(S) : HANAOKA ET AL.

It is certified that error appears in the above-indentified patent and that said Letters Patent is hereby corrected as shown below:

Claim 14, column 23, line 35, "claims 9" should read --claim 9--.

Claim 20, column 24, line 1, "claim 1;" should read --claim 1,--.

Claim 22, column 24, lines 7-8, "claims 1 to 47" should read --claims 1 to 21 and 23 to 27--.

Signed and Sealed this

Eighteenth Day of February, 1997

Attest:

BRUCE LEHMAN

Attesting Officer

Commissioner of Patents and Trademarks